United States Patent
Chen

(10) Patent No.: US 12,301,522 B2
(45) Date of Patent: May 13, 2025

(54) MESSAGE PROCESSING METHOD AND APPARATUS, DEVICE, AND MEDIUM

(71) Applicant: TENCENT TECHNOLOGY (SHENZHEN) COMPANY LIMITED, Shenzhen (CN)

(72) Inventor: Yuzhi Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/456,582

(22) Filed: Aug. 28, 2023

(65) Prior Publication Data
US 2023/0403245 A1    Dec. 14, 2023

Related U.S. Application Data

(63) Continuation of application No. PCT/CN2023/079777, filed on Mar. 6, 2023.

(30) Foreign Application Priority Data

Mar. 24, 2022    (CN) .......................... 202210292548.2

(51) Int. Cl.
*G06F 15/16*    (2006.01)
*H04L 51/04*    (2022.01)
(Continued)

(52) U.S. Cl.
CPC ............ *H04L 51/04* (2013.01); *H04L 51/063* (2013.01); *H04L 51/214* (2022.05)

(58) Field of Classification Search
CPC ..... H04L 51/04; H04L 51/063; H04L 51/214; H04L 51/06; G06F 3/0481; G06F 3/04812; G06F 3/0486; G06F 9/451
See application file for complete search history.

(56) References Cited

U.S. PATENT DOCUMENTS 9,485,348 B2 * 11/2016 Jeong ................ H04M 1/72436
2011/0119337 A1    5/2011 Bishop
(Continued)

FOREIGN PATENT DOCUMENTS

CN    105141496 A    12/2015
CN    108009136 A    5/2018
(Continued)

OTHER PUBLICATIONS

The World Intellectual Property Organization (WIPO) International Search Report for PCT/CN2023/079777 Jun. 13, 2023 10 Pages (including translation).
(Continued)

*Primary Examiner* — John B Walsh
(74) *Attorney, Agent, or Firm* — ANOVA LAW GROUP PLLC

(57) ABSTRACT

A message processing method includes: displaying first message content and second message content; moving the first message content to the second message content in response to a continuous action operation for the first message content; and displaying merged message content in response to an end of the continuous action operation and that the first message content is moved to an area where the second message content is located, the merged message content including the first message content and the second message content.

19 Claims, 20 Drawing Sheets

(51) Int. Cl.
*H04L 51/063* (2022.01)
*H04L 51/214* (2022.01)

(56) References Cited

U.S. PATENT DOCUMENTS

| | | | |
|---|---|---|---|
| 2016/0328140 A1 | 11/2016 | Zhang | |
| 2016/0380959 A1* | 12/2016 | Abou Mahmoud | H04L 51/56 709/206 |
| 2018/0096166 A1 | 4/2018 | Rogers et al. | |
| 2020/0210423 A1 | 7/2020 | Feng et al. | |
| 2023/0325389 A1 | 10/2023 | Fan et al. | |
| 2024/0054129 A1 | 2/2024 | Yang et al. | |
| 2024/0205298 A1* | 6/2024 | Sha | H04L 51/216 |

FOREIGN PATENT DOCUMENTS

| | | |
|---|---|---|
| CN | 110620846 A | 12/2019 |
| CN | 110673770 A | 1/2020 |
| CN | 111382174 A | 7/2020 |
| CN | 112860738 A | 5/2021 |
| CN | 114328504 A | 4/2022 |

OTHER PUBLICATIONS

Instant messaging software, [EB/OL].(Jun. 3, 2010)[Dec. 5, 2021]. https://baike.baidu.com/item即时通信软件 2010250? fr=aladdin.
The World Intellectual Property Organization (WIPO) International Search Report for PCT/CN2022/107690 Oct. 10, 2022 7 Pages (including translation).
Ziyi Huang, "In-depth reading of Handwritten SQL Compiler—Syntax Tree", https://juejin.cn/post/6844903665304600584, Aug. 27, 2018 (Aug. 27, 2018). 12 Pages (including translation).
Baidu Security Laboratory and Shanghai Jiao Tong University LATTICE Laboratory, "Multi-party Secure Computing Hotspot: Privacy-preserving set Intersection technology (PSI) analysis and research report" https://anquan.baidu.com/upload/ue/file/20190814/1565763561975581.pdf 19 Pages.

* cited by examiner

MESSAGE PROCESSING METHOD AND APPARATUS, DEVICE, AND MEDIUM

CROSS-REFERENCES TO RELATED APPLICATIONS

This application is a continuation application of PCT Patent Application No. PCT/CN2023/079777, filed on Mar. 6, 2023, which claims priority to Chinese Patent Application No. 2022102925482, filed with the China National Intellectual Property Administration on Mar. 24, 2022 and entitled "MESSAGE PROCESSING METHOD AND APPARATUS, DEVICE, MEDIUM, AND COMPUTER PROGRAM PRODUCT", the entire contents of both of which are incorporated herein by reference.

FIELD OF THE TECHNOLOGY

The present disclosure relates to the field of communication technologies, in particular, to the field of message processing technologies, and in particular, to a message processing method and apparatus, a device, a medium, and a computer program product.

BACKGROUND

With the development of computer technologies, more and more commutation applications are widely used in daily life of people. Communication applications refer to a type of communication software based on the Internet. A communication application can make a user interact conveniently with another user of the communication application, so that people may communicate freely without worrying about the expensive telephone charge.

When people uses the communication applications to perform information interaction, message merging function may be needed to integrate multiple messages into one message. However, the existing message merging method is complicated in operation, resulting in low efficiency of message merging.

SUMMARY

Based on this, it is necessary to provide a message processing method and apparatus, a device, a medium, and a computer program product for the foregoing technical problems.

In a first aspect, the present disclosure provides a message processing method, which is applied to a terminal, where the method includes: displaying first message content and second message content; moving the first message content to the second message content in response to a continuous action operation for the first message content; and displaying merged message content including the first message content and the second message content in response to the end of the continuous action operation and that the first message content is moved to an area where the second message content is located.

In a second aspect, the present disclosure provides a message processing apparatus, where the apparatus includes: a display module, configured to display first message content and second message content; and a movement module, configured to move the first message content to the second message content in response to a continuous action operation for the first message content; and the display module is further configured to display merged message content including the first message content and the second message content in response to the end of the continuous action operation and that the first message content is moved to an area where the second message content is located.

In a third aspect, the present disclosure provides a computer device, which includes a memory and one or more processors, the memory storing computer-readable instructions, and the one or more processors, when executing the computer-readable instructions, performing steps in each method embodiment of the present disclosure.

In a fourth aspect, the present disclosure provides one or more non-transitory computer-readable storage media, storing computer-readable instructions, the computer-readable instructions, when executed by one or more processors, performing steps in each method embodiment.

Details of one or more embodiments of the present disclosure are provided in the accompanying drawings and descriptions below. Other features, objectives, and advantages of the present disclosure become apparent from the specification, the accompanying drawings, and the claims.

To describe the technical schemes of the embodiments of the present disclosure more clearly, the accompanying drawings required for describing the embodiments are introduced briefly below. Apparently, the accompanying drawings in the following description show only some embodiments of the present disclosure.

DESCRIPTION OF EMBODIMENTS

To make the objectives, technical schemes, and advantages of the present disclosure clearer, the following further describes the present disclosure in detail with reference to the accompanying drawings and the embodiments. It is to be understood that the specific embodiments described herein are only used for explaining the present disclosure, and are not used for limiting the present disclosure.

Figure 1:
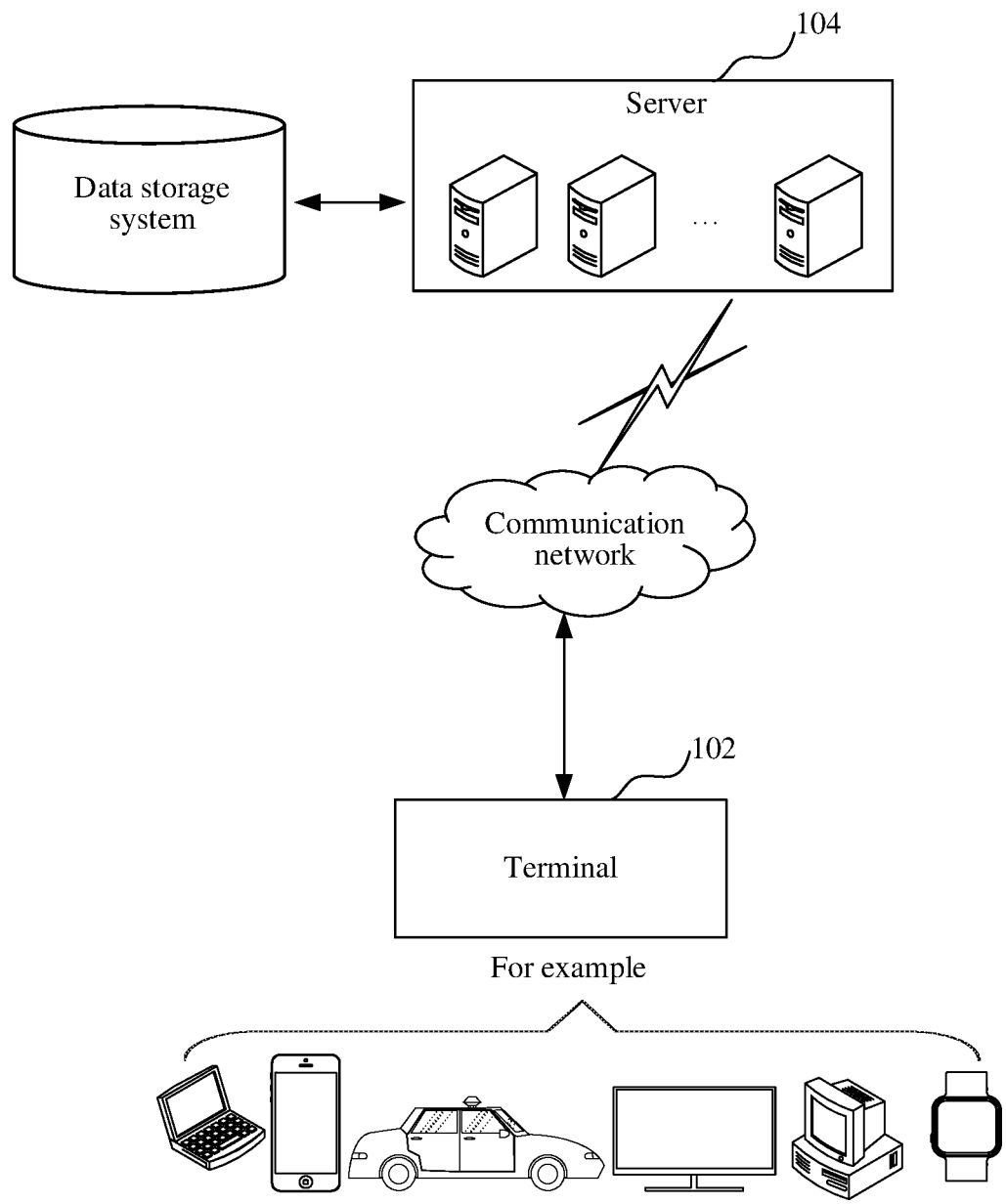
FIG. 1 is a diagram of an application environment of a message processing method in an embodiment.

A message processing method provided in the present disclosure may be applied to an application environment shown in FIG. 1. A terminal 102 communicates with a server 104 by using a network. A data storage system may store data that needs to be processed by the server 104. The data storage system may be integrated onto the server 104, or arranged on cloud or other servers. The terminal 102 may be but is not limited to any personal computer, notebook computer, smartphone, tablet computer, equipment of Internet of Things, and portable wearable device, where the equipment of Internet of Things may be smart speakers, smart TV, smart air conditioners, smart vehicle-mounted equipment, and the like. The portable wearable devices may be smart watches, smart bracelets, head sets, and the like. The server 104 may be an independent physical server, a server cluster or a distributed system composed of a plurality of physical servers, or a cloud server providing basic cloud computation services such as cloud service, cloud databases, cloud computation, cloud functions, cloud storage, network service, cloud communication, middleware service, domain name service, security services, CDN, big data, artificial intelligence platforms, and the like. The terminal 102 and the server 104 may be connected directly or indirectly in a wired or wireless communication way, which is not limited in the present disclosure.

The terminal 102 may display first message content and second message content, and move the first message content to the second message content in response to a continuous action operation for the first message content. In response to that the first message content is moved to an area where the second message content is located, the terminal 102 may display merged message content including the first message content and the second message content in response to the end of the continuous action operation.

The server 104 may provide the first message content and the second message content, and the terminal 102 may merge the first message content and the second message content. The terminal 102 may also acquire the first message content and the second message content locally, and merge the first message content and the second message content. This embodiment does not limit this, and an application scenario in FIG. 1 is only for schematic illustration, and is not limited to this.

Figure 2:
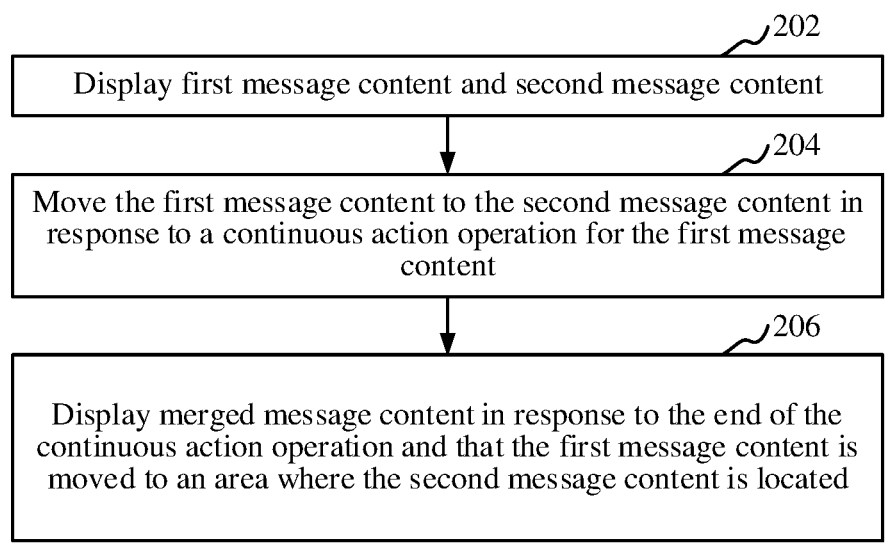
FIG. 2 is a flowchart of a message processing method in an embodiment.

In an embodiment, as shown in FIG. 2, a message processing method is provided. The method may be applied to a terminal, and is executed independently by the terminal, or implemented by interaction between the terminal and the server. This embodiment is described by using an example in which the method is applied to the terminal 102 in FIG. 1. The method includes the following steps:

Step 202: Display first message content and second message content.

The message content is content of a message. The message content may include at least one of message text content, message picture content, message voice content, message video content, and the like. The message is format information for communication, and the message may include at least one of message content, message format, message transmission time, and the like. The first message content and the second message content are used for distinguishing the content of two independent messages, and "first" and "second" are not used as specific limitation to the message content.

In some embodiments, the terminal may acquire the first message content and the second message content, and display the first message content and the second message content in a display interface of the terminal.

In an embodiment, the terminal may determine message acquisition time corresponding to the first message content and the second message content respectively, and sequentially display the first message content and the second message content in the display interface of the terminal according to a sequence of the message acquisition time corresponding to the first message content and the second message content respectively. The message acquisition time corresponding to the first message content and the second message content respectively are time when the terminal acquires the first message content and the second message content respectively. Since the message acquisition time may reflect the sequence of conversation time of users, the first message content and the second message content are displayed sequentially according to the sequence of the message acquisition time, which may make the displayed content more conversational and logical, and improve a display effect of the message content.

Step 204: Move the first message content to the second message content in response to a continuous action operation for the first message content.

The continuous action operation is a control operation continuously acting on the first message content.

In some embodiments, the user may trigger the continuous action operation for the first message content, and the terminal may control the first message content to move to the second message content in response to the continuous action operation for the first message content.

In an embodiment, the continuous action operation may include at least one of a drag operation, a long press operation, and the like. For example, in response to that the continuous action operation is the drag operation, the terminal may control the first message content to move to the second message content in response to the drag operation for the first message content.

In an embodiment, the terminal may control the first message content to move to the second message content along a movement direction to which the continuous action operation points in response to the continuous action operation for the first message content.

Step 206: Display merged message content in response to the end of the continuous action operation and that the first message content is moved to an area where the second message content is located. The merged message content includes the first message content and the second message content.

The area where the second message content is located refers to an area range to which the location of the second message content belongs. The end of the continuous action operation refers to that the continuous action operation does not act on the first message content continuously. The merged message content is new message content obtained by merging the first message content and the second message content.

In some embodiments, the terminal may determine a movement position of the first message content so as to judge whether the first message content is already moved to the area where the second message content is located. In response to that the movement position of the first message content is located in the area where the second message content is located, it is judged that the first message content is already moved to the area where the second message content is located. In response to that the first message content is moved to the area where the second message content is located, the terminal may judge whether the continuous action operation for the first message content is already ended; and in response to that the continuous action operation for the first message content is already ended, the terminal may merge the first message content and the second message content in response to the end of the continuous action operation to obtain the merged message content including the first message content and the second message content, and display the merged message content including the first message content and the second message content in the display interface of the terminal.

In an embodiment, in response to that the first message content is not moved to the area where the second message content is located, and/or, the continuous action operation for the first message content is not ended, the terminal may not merge the first message content and the second message content.

In an embodiment, in response to that the first message content is not moved to the area where the second message content is located, but the continuous action operation is ended, the terminal may resume displaying the first message content in an initial position before the continuous action operation. The initial position is a position where the first message content is located before responding to the continuous action operation. Since a result of the continuous action operation does not satisfy a message merging condition, the message content may be resumed to display normally by resuming displaying the moved first message content in the position before the continuous action operation so as to facilitate the next merging operation, thereby improving the message merging efficiency.

In an embodiment, the first message content and the second message content are displayed in an information interaction page. In response to that the first message content is moved to the area where the second message content is located in the information interaction page, the terminal may display the merged message content including the first message content and the second message content in the information interaction page in response to the end of the continuous action operation. The information interaction page is a page for information interaction. The information interaction page may be rendered in the display interface of the terminal.

In an embodiment, the number of message merging is multiple times. The merged message content merged at this time may be used as the first message content or the second message content of the next message merging to participate in a next message merging process. In this way, the first message content and the second message content participating in the message merging are not limited to the message content inputted by the user, so that the source of the content for the message merging is richer. The message merging is continued on the basis of a previous merged result, which may also improve the message merging efficiency.

In the foregoing message processing method, by displaying the first message content and the second message content, the first message content may be moved to the second message content in response to the continuous action operation for the first message content. In response to that the first message content is moved to the area where the second message content is located, in response to the end of the continuous action operation, the merged message content including the first message content and the second message content may be displayed. Compared with selecting multiple messages for message merging in related art, in the present disclosure, the first message content is moved to the second message content through the continuous action operation for the first message content so as to merge the first message content and the second message content, which may integrate multiple messages into one message more conveniently, thereby improving the message merging efficiency.

In an embodiment, the first message content and the second message content are displayed in the information interaction page; the method further includes: in response to a movement activation operation for the first message content, the first message content is activated, and the information interaction page is fixed; a display position of the fixed information interaction page is not changed during the continuous action operation for the first message content; and in response to the continuous action operation for the first message content, moving the first message content to the second message content includes: in response to the continuous action operation for the activated first message content, the first message content is moved to the second message content in the fixed information interaction page.

The movement activation operation is an operation for activating the first message content, and the activated first message content may be moved. The display position of the page is not changed, that is, the fixed information interaction page does not slide.

In some embodiments, the terminal may activate the first message content in response to the movement activation operation for the first message content, that is, after the first message content is activated, the movement of the activated first message content to the second message content may be supported upon subsequent response to the continuous action operation for the first message content. At the same time, after the first message content is activated, the terminal may fix the information interaction page. The terminal may move the first message content to the second message content in the fixed information interaction page in response to the continuous action operation for the activated first message content.

In the foregoing embodiment, the first message content may be activated in response to the movement activation operation for the first message content, so that the activated first message content may be moved to the second message content subsequently. At the same time, by fixing the information interaction page, and moving the first message content to the second message content in the fixed information interaction page, the influence of sliding of the information interaction page on moving the first message content to the second message content may be avoided, so that the first message content may be ensured to be moved correctly to the second message content, and the movement accuracy of the message content is improved.

In an embodiment, the first message content and the second message content are displayed in the information interaction page; the method further includes: in response to the movement activation operation for the first message content, the first message content is activated, and a page sliding state of the information interaction page is maintained; a display position of the information interaction page in the page sliding state may be changed during the continuous action operation for the first message content; and in response to the continuous action operation for the first message content, moving the first message content to the second message content includes: in response to the continuous action operation for the activated first message content, the first message content is moved to the second message content in the information interaction page in the page sliding state.

In an embodiment, in response to the continuous action operation for the first message content, moving the first message content to the second message content includes: in response to the continuous action operation for the first message content, the first message content is moved to the second message content with the movement of an operation point of the continuous action operation.

The operation point of the continuous action operation refers to an operation position of the continuous action operation.

In some embodiments, the terminal may determine the operation point of the continuous action operation in response to the continuous action operation for the first message content, and control the first message content to move to the second message content with the movement of the operation point of the continuous action operation.

In the foregoing embodiment, by controlling the first message content to move to the second message content with the movement of the operation point of the continuous action operation, it may be ensured that the first message content may be moved to the second message content correctly, thereby improving the movement accuracy of the message content.

In an embodiment, the continuous action operation includes a drag operation; and in response to the continuous action operation for the first message content, making the first message content move to the second message content with the movement of the operation point of the continuous action operation includes: in response to the drag operation for the first message content, the first message content is moved to the second message content with the movement of a drag operation point of the drag operation.

The drag operation point of the drag operation refers to a drag position of the drag operation.

In some embodiments, the terminal may determine the drag operation point of the drag operation in response to the drag operation for the first message content, and control the first message content to move to the second message content with the movement of the drag operation point of the drag operation.

In the foregoing embodiment, by controlling the first message content to move to the second message content with the movement of the drag operation point of the drag operation, it may be ensured that the first message content may be moved to the second message content correctly, thereby improving the movement accuracy of the message content.

In an embodiment, the first message content and the second message content are displayed in a message display area of the information interaction page; and in response to that the first message content is moved to the area where the second message content is located, in response to the end of the continuous action operation, displaying the merged message content including the first message content and the second message content includes: in response to that the first message content is moved to the area where the second message content is located in the message display area, in response to the end of the continuous action operation, the merged message content including the first message content and the second message content is displayed in the message display area.

The message display area refers to an area used for displaying message content in the information interaction page.

In some embodiments, the terminal may judge whether the first message content is already moved to the area where the second message content is located in the message display area. In response to that the first message content is moved to the area where the second message content is located in the message display area, the terminal may merge the first message content and the second message content in the message display area in response to the end of the continuous action operation, and display the merged message content including the first message content and the second message content in the message display area.

In an embodiment, the terminal may determine a movement position of the first message content, and judge that the first message content is already moved to the area where the second message content is located in the message display area in response to that the movement position of the first message content is located in the area where the second message content is located in the message display area.

In the foregoing embodiment, by displaying the merged message content including the first message content and the second message content in the message display area, the subsequent message processing for the merged message content may be facilitated, thereby improving the message processing efficiency.

In an embodiment, the method further includes: in the message display area, at least one message processing identifier for the merged message content is displayed; each message processing identifier indicates a type of message processing manner; and in response to a trigger operation for the message processing identifier, the merged message content is correspondingly processed.

The message processing identifier is a type of symbol for exclusively identifying the message processing manner, and the symbol may include at least one of characters, numbers, letters, special characters, and the like.

In some embodiments, the terminal may display at least one message processing identifier for the merged message content in the message display area of the information interaction page. Further, the terminal may correspondingly process the merged message content in response to the trigger operation for any message processing identifier in the at least one message processing identifier.

In the foregoing embodiment, by providing the message processing identifier for the merged message content in the message display area, and by responding to the trigger operation for the message processing identifier, the merged message content may be correspondingly processed rapidly and conveniently, thereby improving the message processing efficiency.

In an embodiment, the terminal may display at least one message processing identifier for the merged message content in the information interaction page; and each message processing identifier indicates a type of message processing manner. The terminal may correspondingly process the merged message content in the message display area in response to the trigger operation for the message processing identifier.

In an embodiment, at least one message processing identifier includes at least one of a message forwarding identifier and a message collection identifier; correspondingly processing the merged message content in response to the trigger operation for the message processing identifier includes at least one of the following processing: in response to the trigger operation for the message forwarding identifier, the merged message content is forwarded; and in response to the trigger operation for the message collection identifier, the merged message content is collected.

The message forwarding identifier is a symbol for identifying the forwarding of the merged message content. The message collection identifier is a symbol for identifying the collection of the merged message content.

In some embodiments, the terminal may forward the merged message content in response to the trigger operation for the message forwarding identifier, and/or, the terminal may collect the merged message content in response to the trigger operation for the message collection identifier.

In the foregoing embodiment, by providing the message forwarding identifier in the message display area, and by responding to the trigger operation for the message forwarding identifier, the merged message content may be forwarded rapidly and conveniently, thereby improving the forwarding efficiency of the message content. By providing the message collection identifier in the message display area, and by responding to the trigger operation for the message collection identifier, the merged message content may be collected rapidly and conveniently, thereby improving the collection efficiency of the message content.

In an embodiment, the message processing identifier may further include a message deletion identifier, and in response to the trigger operation for the message deletion identifier, the terminal may delete the merged message content.

In an embodiment, in response to that the first message content is moved to the area where the second message content is located in the message display area, in response to the end of the continuous action operation, displaying the merged message content including the first message content and the second message content in the message display area includes: in response to that a distance between the moved first message content and second message content satisfies a distance proximity condition, in response to the end of the continuous action operation, the merged message content including the first message content and the second message content is displayed in the message display area.

The distance between the first message content and the second message content refers to a distance between the location of the first message content and the location of the second message content.

In an embodiment, the distance proximity condition includes that the distance between the location of the first message content and the location of the second message content is less than a preset distance threshold, or the distance between the location of the first message content and the location of the second message content is within a preset distance range.

In some embodiments, the terminal may judge whether the distance between the continuously moved first message content and second message content satisfies the distance proximity condition; and in response to that the distance between the continuously moved first message content and second message content satisfies the distance proximity condition, the terminal may merge the first message content and the second message content in the message display area in response to the end of the continuous action operation, and display the merged message content including the first message content and the second message content in the message display area.

In the foregoing embodiment, in response to that the distance between the continuously moved first message content and second message content satisfies the distance proximity condition, in response to the end of the continuous action operation, the first message content and the second message content may be merged rapidly in the message display area, thereby further improving the message merging efficiency.

In an embodiment, the first message content is stored in a first message bubble in the message display area; the second message content is stored in a second message bubble in the message display area; the continuous action operation is configured to move the first message bubble to the second message bubble; and in response to that the first message content is moved to the area where the second message content is located, in response to the end of the continuous action operation, displaying the merged message content including the first message content and the second message content includes: in response to that the distance between the moved first message bubble and second message bubble satisfies the distance proximity condition, in response to the end of the continuous action operation, the first message bubble and the second message bubble are fused in the message display area to obtain a fused message bubble; and the merged message content including the first message content and the second message content is displayed in the fused message bubble.

The first message bubble is an area for storing the first message content in the message display area. The second message bubble is an area for storing the second message content in the message display area. The first message bubble and the second message bubble are two independent areas located in the message display area.

In some embodiments, the terminal may judge whether the distance between the continuously moved first message bubble and second message bubble satisfies the distance proximity condition, and in response to that the distance between the continuously moved first message bubble and second message bubble satisfies the distance proximity condition, the terminal may fuse the first message bubble and the second message bubble in the message display area to obtain a fused message bubble in response to the end of the continuous action operation. The terminal may merge the first message content and the second message content, and display the merged message content including the first message content and the second message content in the fused message bubble.

In an embodiment, before responding to the continuous action operation, the terminal may acquire coordinates of the first message bubble and the second message bubble respectively, and in response to that the first message bubble is moved to the second message bubble in response to the continuous action operation, the terminal may acquire the coordinate of the first message bubble regularly in a movement process through a timer. In response to that the first message bubble is close to the coordinate of the second message bubble, that is, the distance between the coordinate of the first message bubble and the coordinate of the second message bubble is less than the preset distance threshold, the first message bubble and the second message bubble are fused to obtain the fused message bubble.

Figure 3:
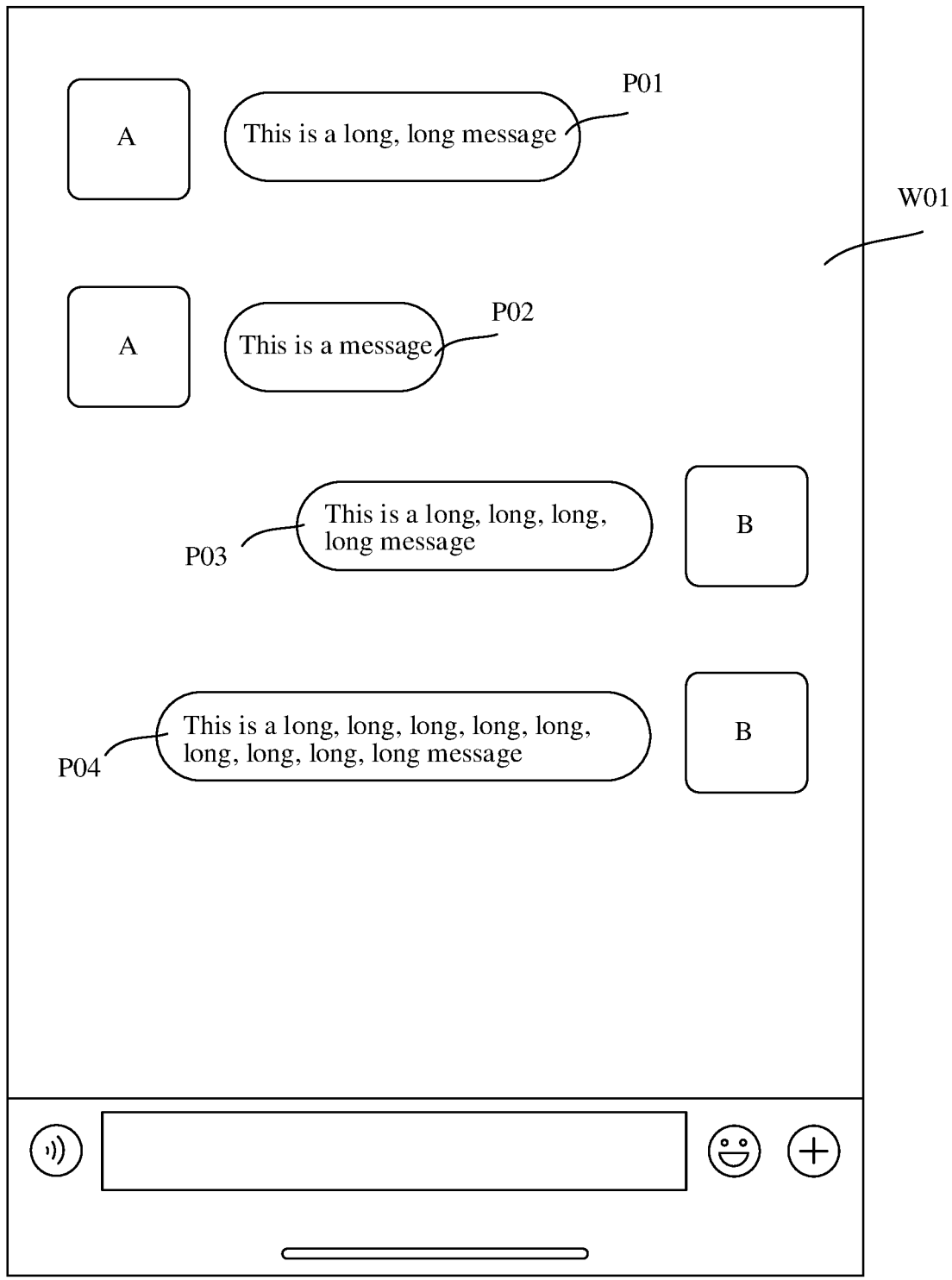
FIG. 3 is a schematic diagram of message content display in an embodiment.
Figure 4:
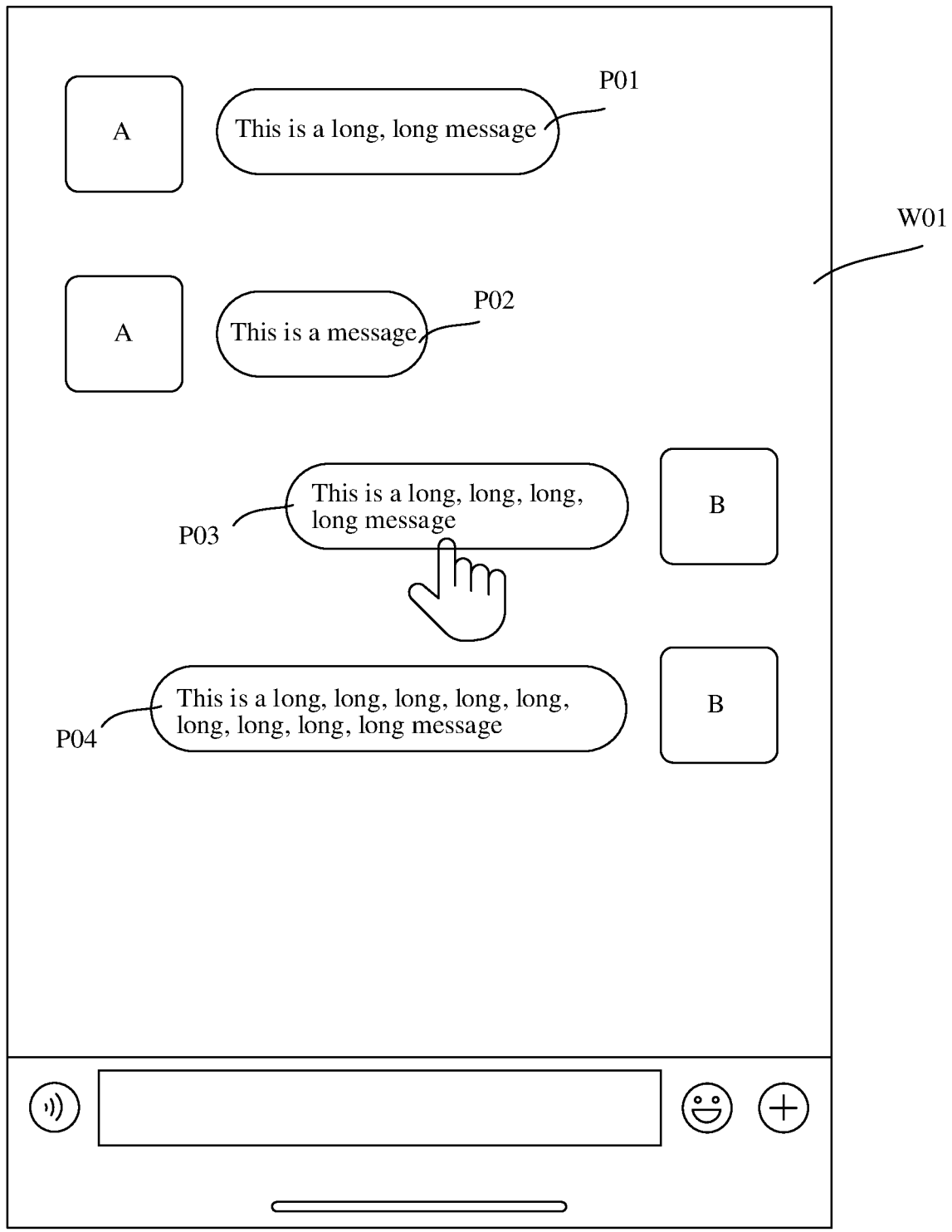
FIG. 4 is a schematic diagram of a message content activation process in an embodiment.
Figure 5:
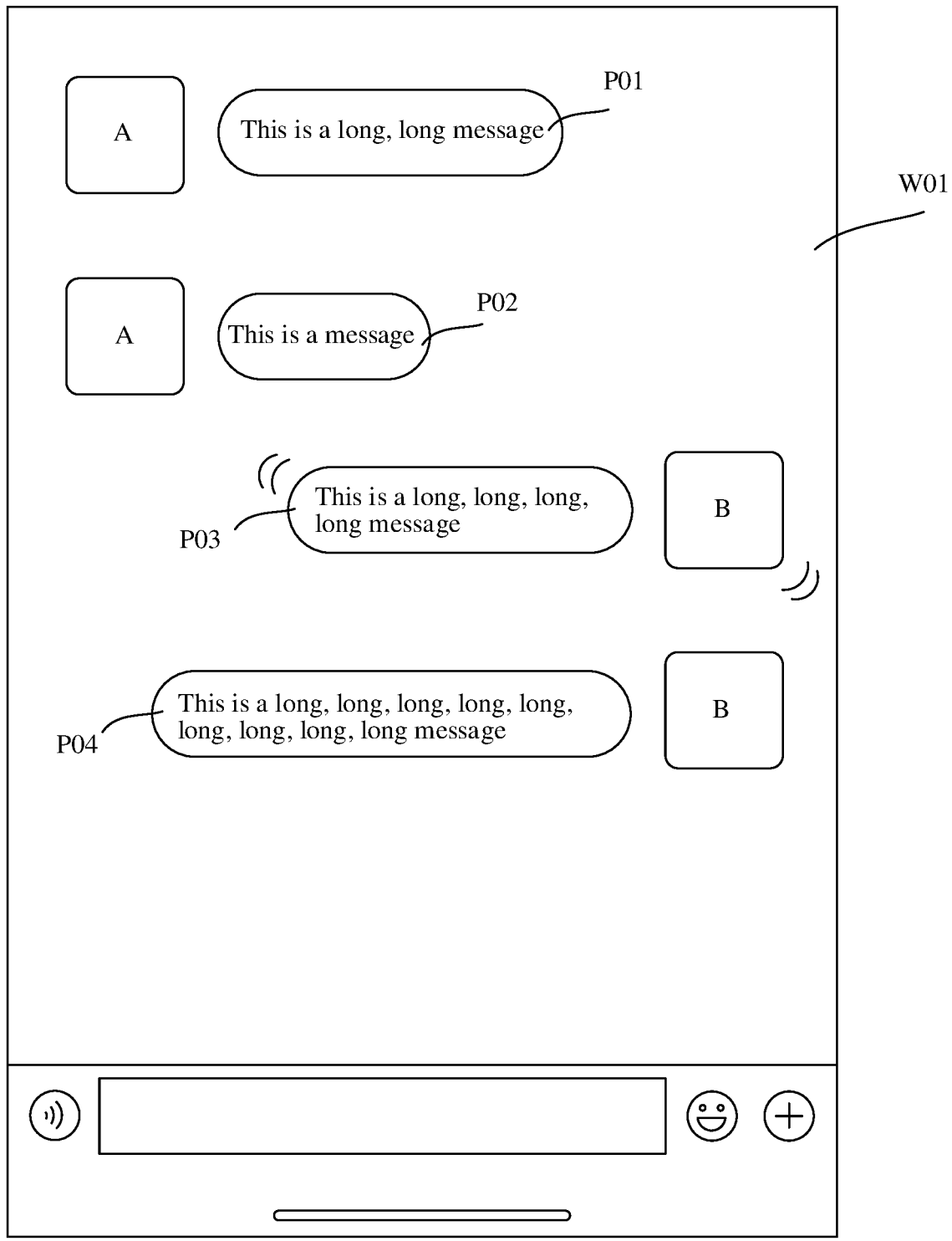
FIG. 5 is a schematic diagram of activated message content in an embodiment.
Figure 6:
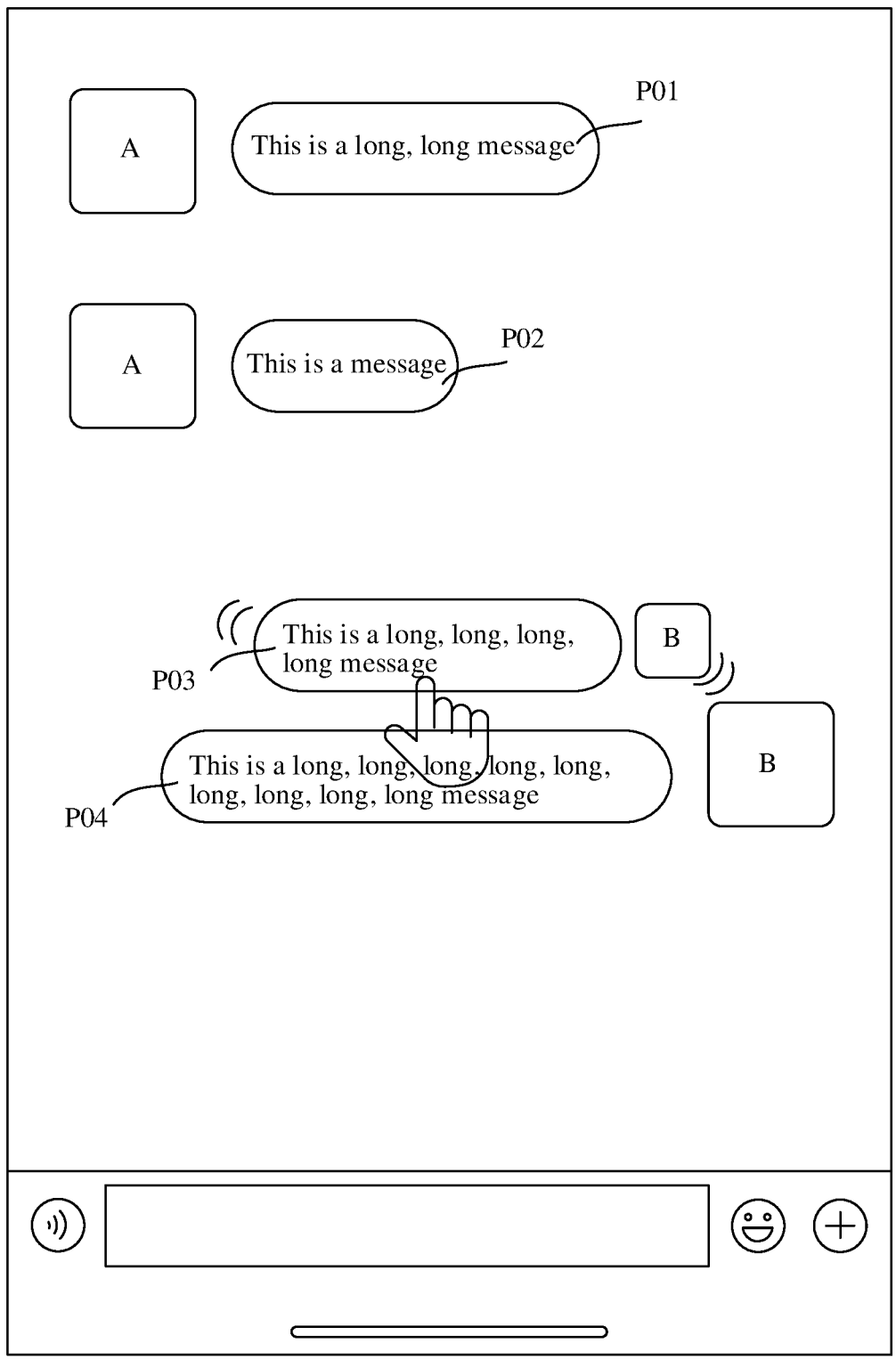
FIG. 6 is a schematic diagram of a process in which a message bubble is dragged to move to another message bubble in an embodiment.
Figure 7:
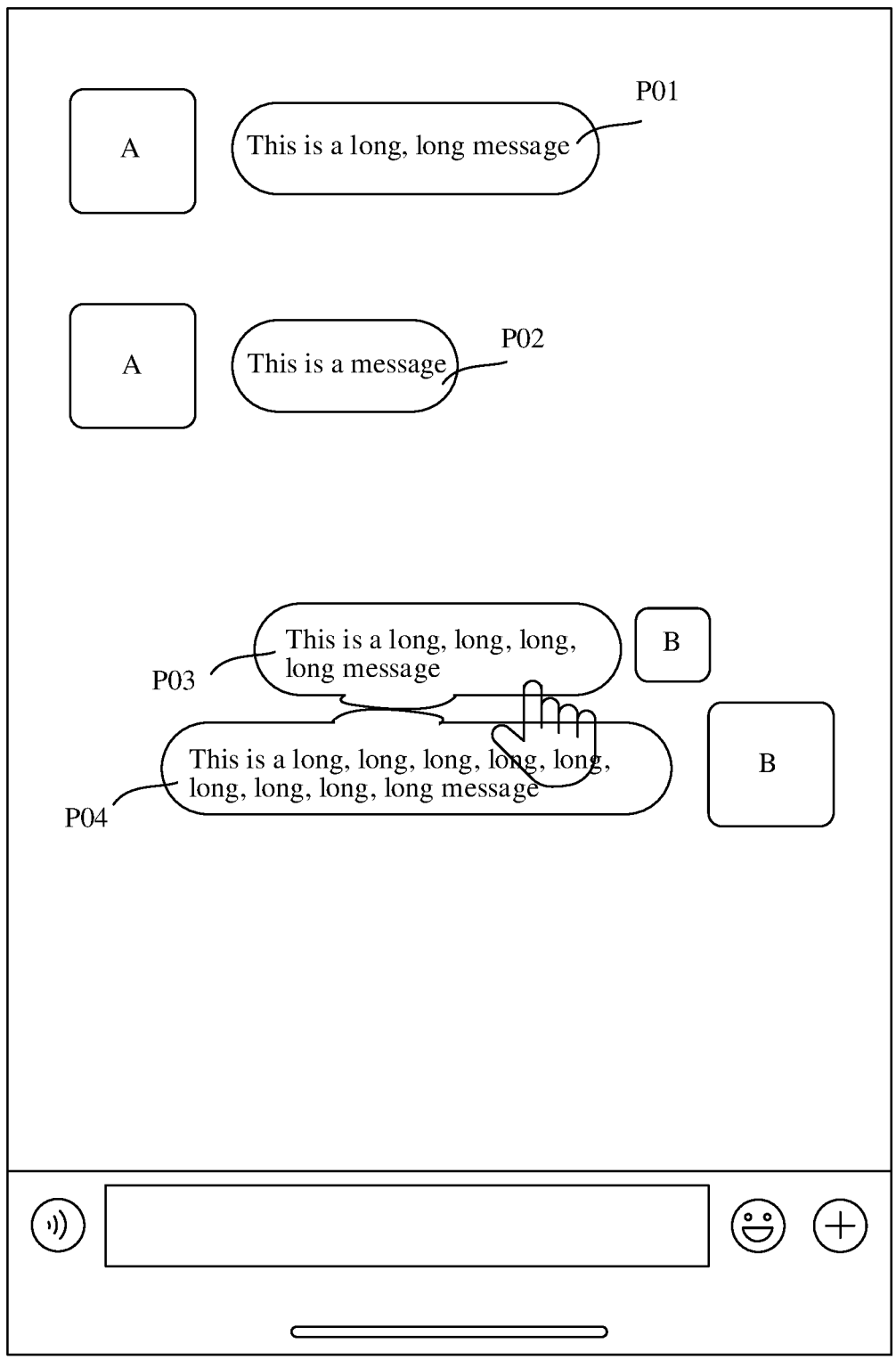
FIG. 7 is a schematic diagram of a fusion process of two message bubbles in an embodiment.
Figure 8:
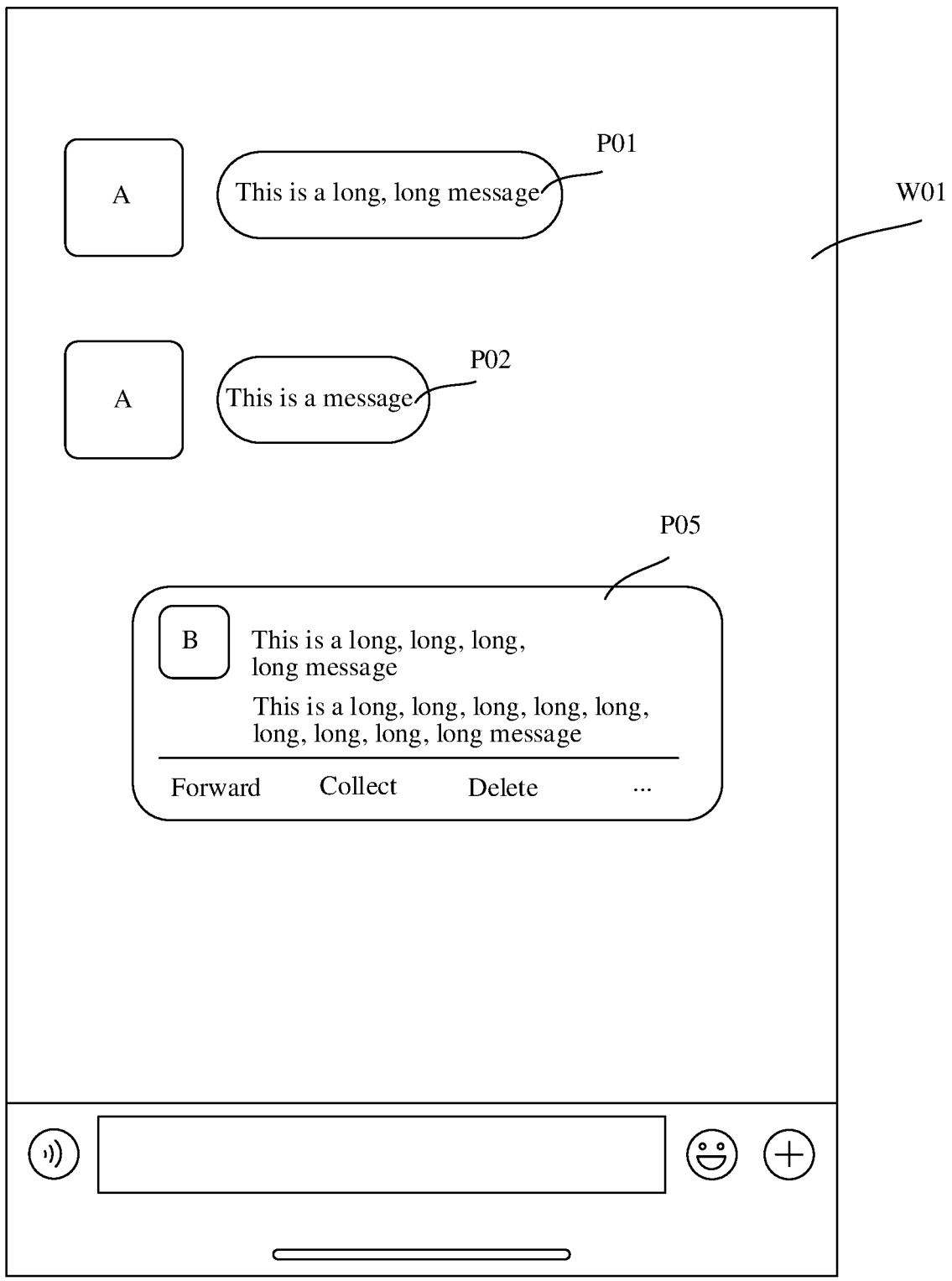
FIG. 8 is a schematic diagram of a fused message bubble and merged message content in an embodiment.

In an embodiment, the continuous action operation includes the drag operation. As shown in FIG. 3, the message display area W01 includes four message bubbles, i.e. P01, P02, P03, and P04, and each message bubble stores message content respectively. For example, P03 is the first message bubble, P04 is the second message bubble, P03 stores the first message content, i.e. "this is a long, long, long, long message", and P04 stores the second message content, i.e. "this is a long, long, long, long, long, long, long, long, long message". As shown in FIG. 4, the terminal may activate the first message bubble P03 in response to the movement activation operation for the first message content in P03. For example, P03 may be activated by clicking the first message bubble P03. Referring to FIG. 5, the first message bubble P03 is in an activated state, which indicates that the first message bubble P03 may be moved. As shown in FIG. 6, the terminal may move the first message bubble P03 to the second message bubble P04 in response to the drag operation for the first message bubble P03. As shown in FIG. 7, in response to that the distance between the moved first message bubble P03 and second message bubble P04 satisfies the distance proximity condition, the first message bubble P03 and the second message bubble P04 begins to be fused. As shown in FIG. 8, the terminal may fuse the first message bubble P03 and the second message bubble P04 in the message display area W01 in response to the end of the drag operation to obtain the fused message bubble P05, and display the merged message content including the first message content and the second message content in the fused message bubble P05, that is, display "this is a long, long, long, long message this is a long, long, long, long, long, long, long, long, long message".

Figure 9:
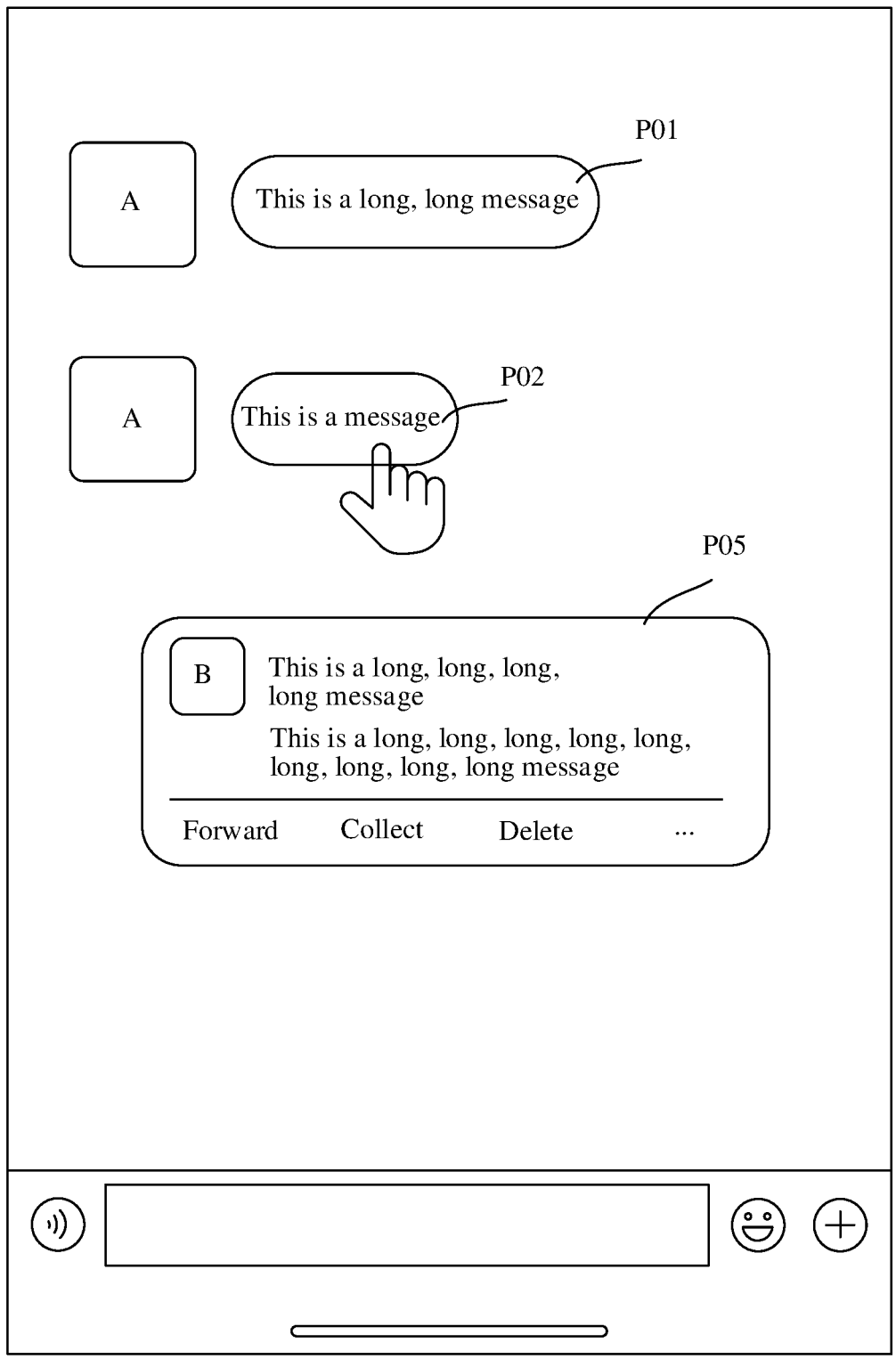
FIG. 9 is a schematic diagram of a message content activation process in another embodiment.
Figure 10:
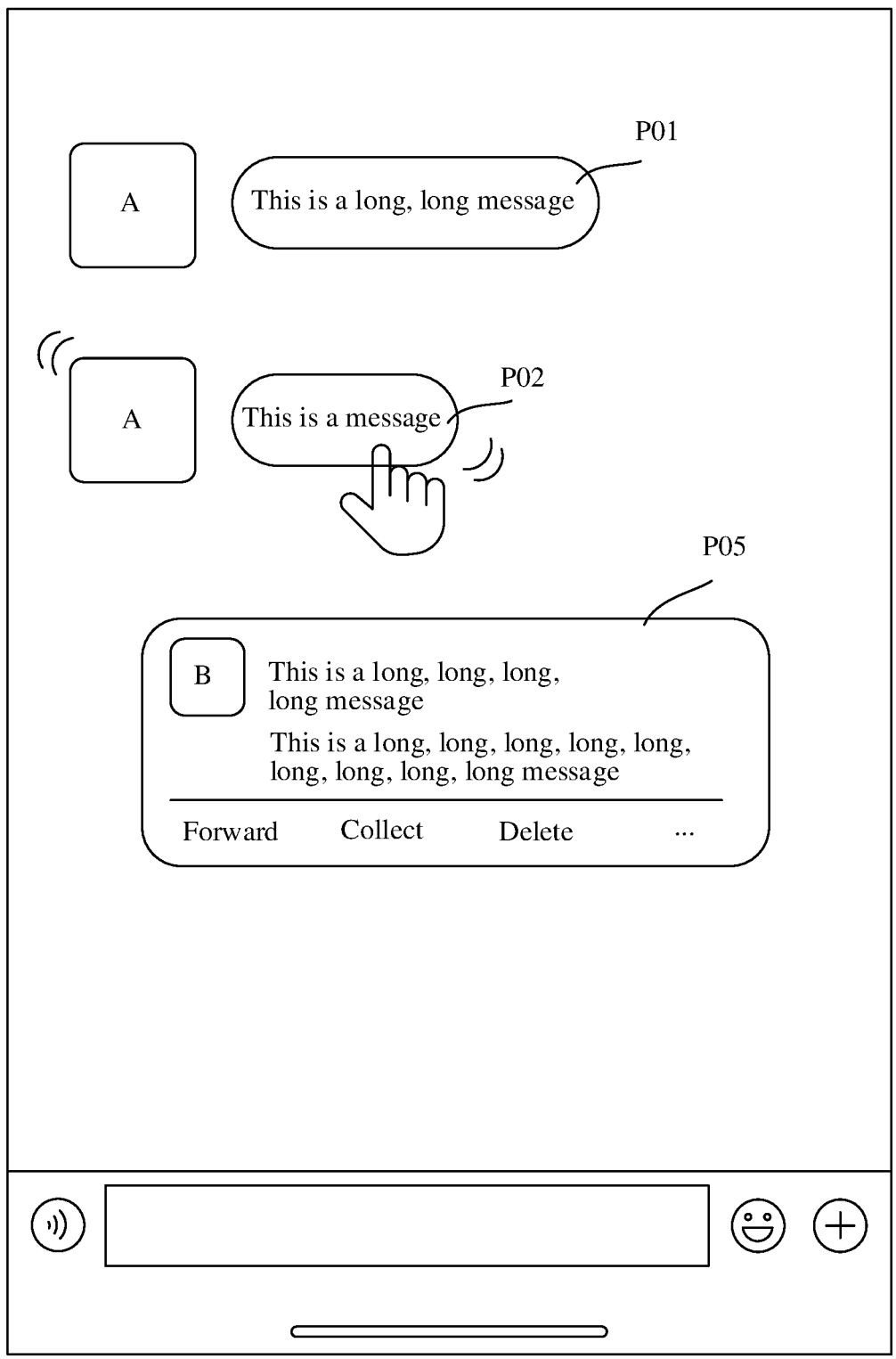
FIG. 10 is a schematic diagram of activated message content in another embodiment.
Figure 11:
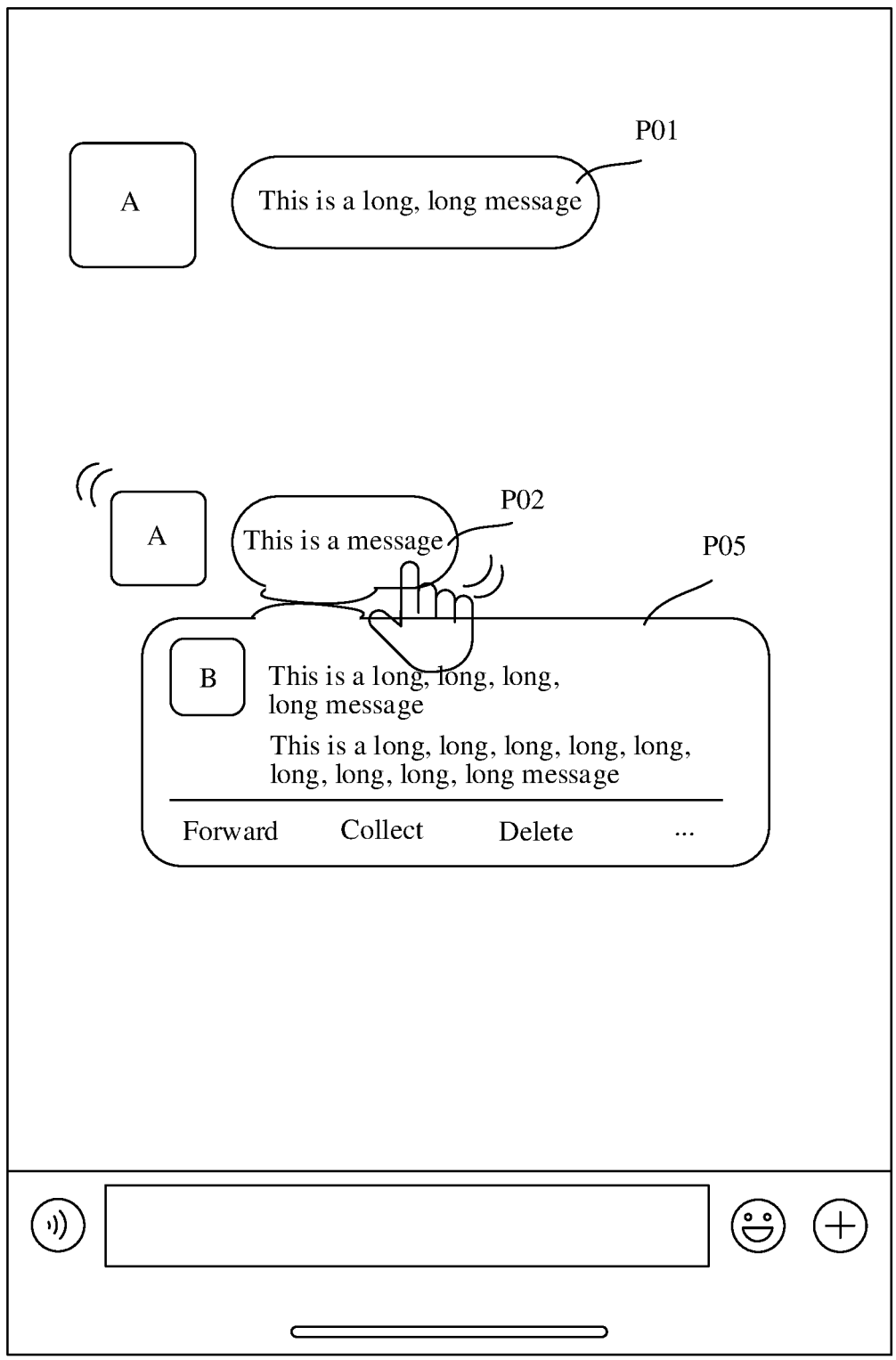
FIG. 11 is a schematic diagram of a fusion process of two message bubbles in another embodiment.
Figure 12:
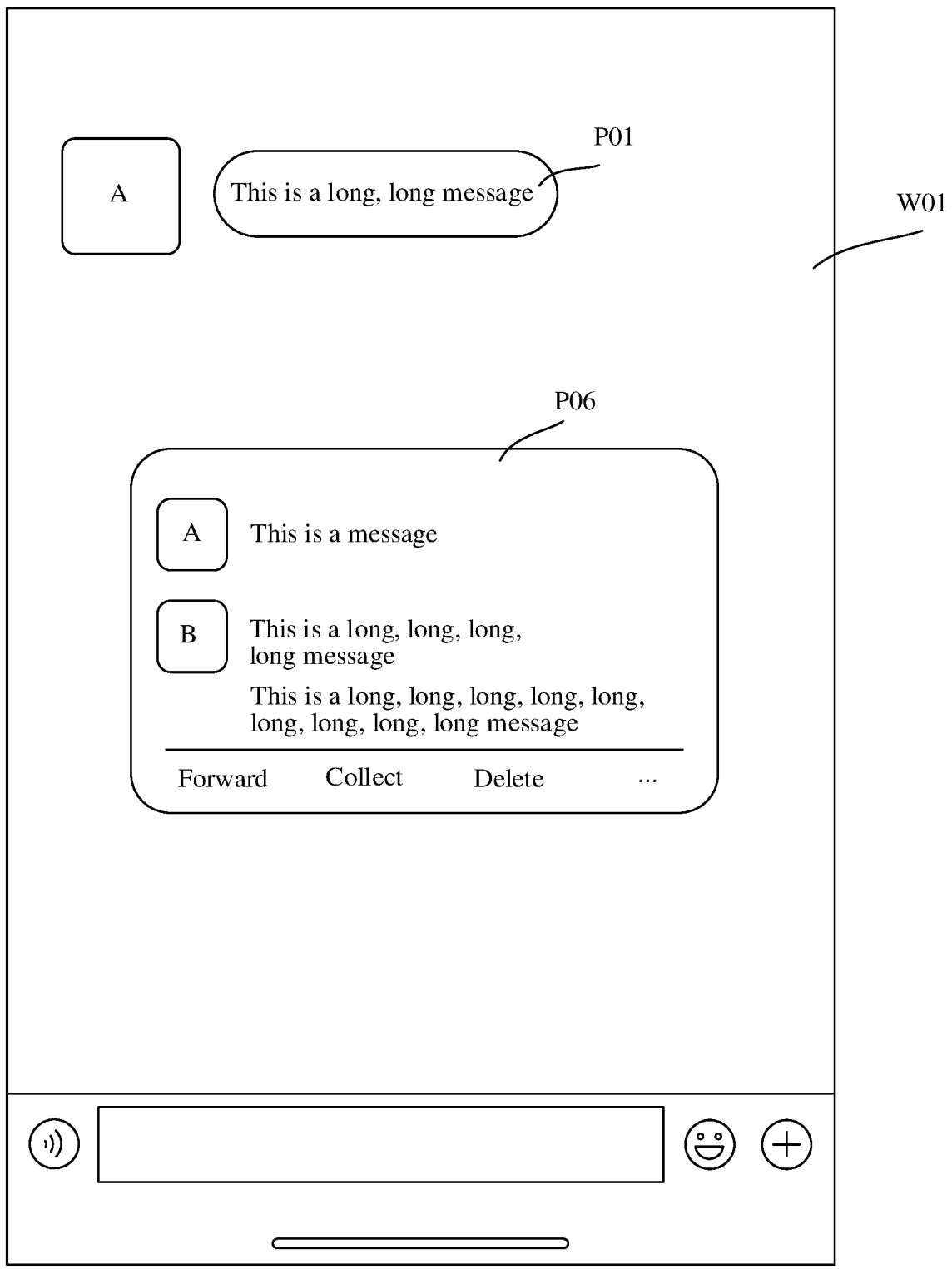
FIG. 12 is a schematic diagram of a fused message bubble and merged message content in another embodiment.

In an embodiment, the continuous action operation includes the drag operation. The merged message content may be used as the first message content or the second message content of the next message merging to participate in the next message merging process. As shown in FIG. 9, P02 is the first message bubble, P05 is the second message bubble, P02 stores the first message content, i.e. "this is a message", and P05 stores the second message content, i.e. "this is a long, long, long, long message this is a long, long, long, long, long, long, long, long, long message". The terminal may activate the first message bubble P02 in response to the movement activation operation for the first message content in P02. For example, P02 may be activated by clicking the first message bubble P02. Referring to FIG. 10, the first message bubble P02 is in an activated state, which indicates that the first message bubble P02 may be moved. As shown in FIG. 11, the terminal may move the first message bubble P02 to the second message bubble P05 in response to the drag operation for the first message bubble P02, and begin to fuse the first message bubble P02 and the second message bubble P05 in response to that the distance between the moved first message bubble P02 and second message bubble P05 satisfies the distance proximity condition. As shown in FIG. 12, the terminal may fuse the first message bubble P02 and the second message bubble P05 in the message display area W01 in response to the end of the drag operation to obtain the fused message bubble P06, and display the merged message content including the first message content and the second message content in the fused message bubble P06, that is, display "this is a message this is a long, long, long, long message this is a long, long, long, long, long, long, long, long, long message".

Figure 13:
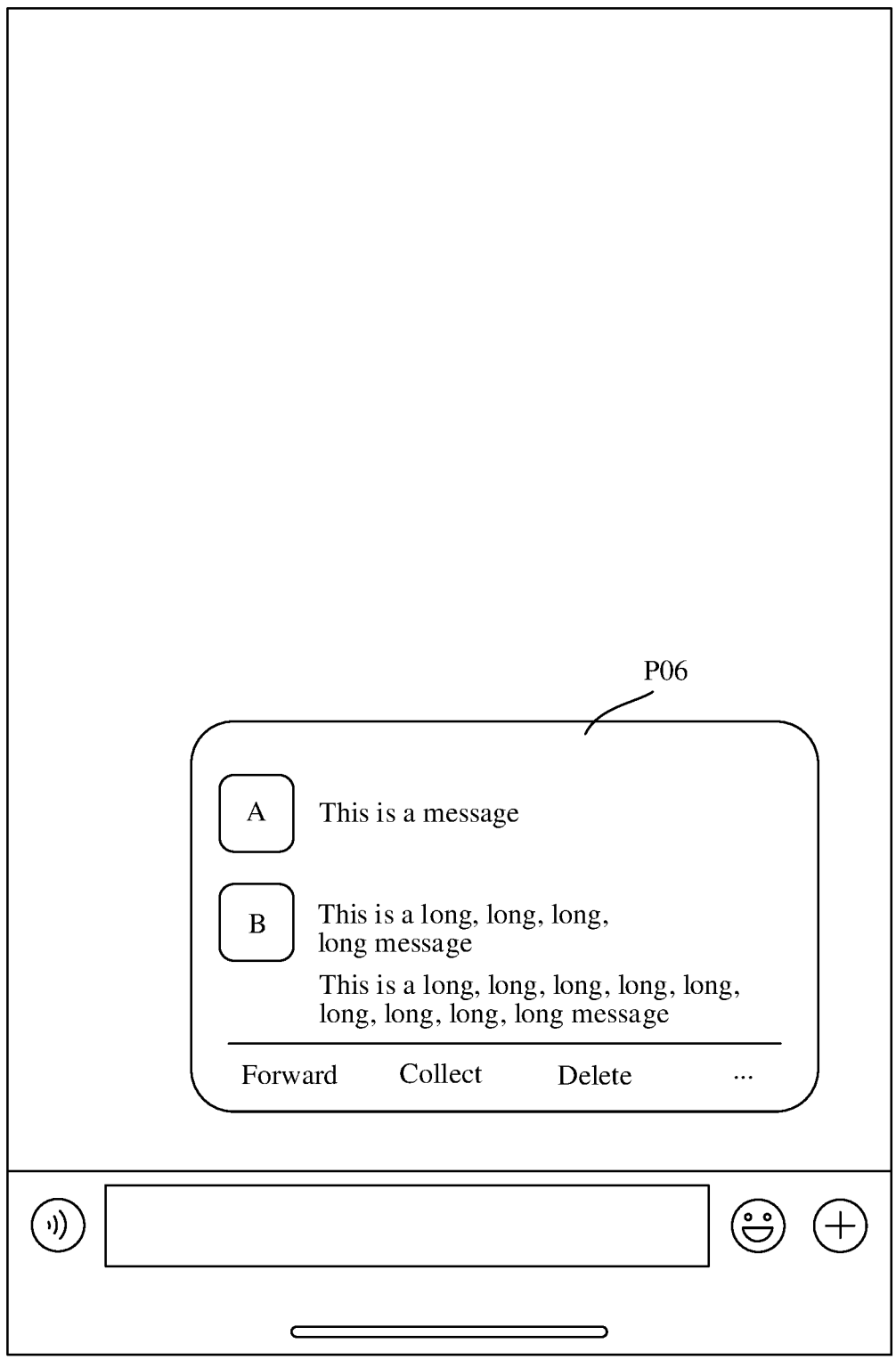
FIG. 13 is a schematic diagram after forwarding a merged message in an embodiment.

In an embodiment, as shown in FIG. 12, the terminal may display the message processing identifier such as the message forwarding identifier, the message collection identifier, the message deletion identifier, and the like in the fused message bubble P06. As shown in FIG. 13, the terminal may forward the merged message content in the fused message bubble P06 in response to the trigger operation for the message forwarding identifier.

In the foregoing embodiment, in response to that the distance between the moved first message bubble and second message bubble satisfies the distance proximity condition, by responding to the end of the continuous action operation, the first message bubble and the second message bubble may be fused in the message display area, and the merged message content including the first message content and the second message content is displayed in the fused message bubble, thereby further improving the message merging efficiency.

In an embodiment, in response to that the distance between the moved first message bubble and second message bubble satisfies the distance proximity condition, in response to the end of the continuous action operation, fusing the first message bubble and the second message bubble in the message display area to obtain a fused message bubble includes: in response to that the distance between the moved first message bubble and second message bubble satisfies the distance proximity condition, in response to the end of the continuous action operation, the first message bubble and the second message bubble are fused in the message display area to obtain the fused message bubble, and the first message bubble and the second message bubble are no longer displayed.

In some embodiments, the terminal may judge whether the distance between the moved first message bubble and second message bubble satisfies the distance proximity condition, and in response to that the distance between the moved first message bubble and second message bubble satisfies the distance proximity condition, the terminal may fuse the first message bubble and the second message bubble in the message display area in response to the end of the continuous action operation to obtain the fused message bubble, and stop displaying the first message bubble and the second message bubble, that is, after the fused message bubble is generated, the first message bubble and the second message bubble are no longer displayed in the message display area.

In an embodiment, the terminal may fuse the first message bubble and the second message bubble in the message display area in response to the end of the continuous action operation to obtain the fused message bubble, and delete the first message bubble and the second message bubble in the message display area, so that after the fused message bubble is generated, the first message bubble and the second message bubble are no longer displayed in the message display area.

In an embodiment, the terminal may fuse the first message bubble and the second message bubble in the message display area in response to the end of the continuous action operation to obtain the fused message bubble, and conceal the first message bubble and the second message bubble in the message display area, that is, the first message bubble and the second message bubble are in an invisible state, so that after the fused message bubble is generated, the first message bubble and the second message bubble are no longer displayed in the message display area.

In the foregoing embodiment, by displaying the merged message content including the first message content and the second message content in the fused message bubble, and making the first message bubble and the second message bubble no longer displayed, so that the repeated message content may be prevented from being displayed in the message display area, thereby improving an area utilization rate and area display effect of the message display area.

In an embodiment, the terminal may fuse the first message bubble and the second message bubble in the message display area in response to the end of the continuous action operation to obtain the fused message bubble, and resume displaying the first message bubble in the position where the first message bubble is located before the continuous action operation.

In an embodiment, the first message content is transmitted by a first user object; the first message bubble is displayed in the message display area correspondingly to visual information of the first user object before being moved; and in response to the continuous action operation for the first message content, moving the first message content to the second message content includes: in response to the continuous action operation for the first message bubble display between the visual information of the first user and the first message bubble is maintained, and the visual information of the first user object and the first message bubble are moved to the second message bubble.

The visual information refers to the visual information for describing the user object.

In some embodiments, the terminal may maintain the corresponding display between the visual information of the first user and the first message bubble in the message display area in response to the continuous action operation for the first message bubble, and while maintaining the corresponding display between the visual information of the first user and the first message bubble, the terminal may move the visual information of the first user object and the first message bubble together to the second message bubble. In response to that the visual information of the first user object and the first message bubble are moved to the area where the second message content is located, the terminal may display the merged message content including the first message content and the second message content in the message display area in response to the end of the continuous action operation.

In an embodiment, the visual information may include at least one of images, videos, and the like. For example, the visual information may be a head portrait picture of the user object.

In an embodiment, the continuous action operation includes a drag operation. Referring to FIG. 3, FIG. 4, and FIG. 5, in response to that the first message content in the first message bubble P03 is transmitted by the first user object, the first message bubble P03 is displayed in the message display area W01 correspondingly to the visual information B of the first user object before being moved. Referring to FIG. 6 and FIG. 7, the terminal may move the visual information B of the first user object and the first message bubble P03 to the second message bubble P04 in response to the drag operation for the first message bubble P03 in response to that the corresponding display between the visual information B of the first user and the first message bubble P03 is maintained.

In the foregoing embodiment, in response to the continuous action operation for the first message bubble, the corresponding display between the visual information of the first user and the first message bubble is maintained, the visual information of the first user object and the first message bubble are moved to the second message bubble, so that during the movement of the first message bubble, by which user object the first message content in the first message bubble is transmitted may be known rapidly, thereby improving the visual effect of a message merging process.

In an embodiment, in response to that the second message content is transmitted by the first user object, the visual information of the first user object is displayed in association with the merged message content in the fused message bubble.

For example, as shown in FIG. 8, in response to that both the first message content "this is a long, long, long, long message" and the second message content "this is a long, long, long, long, long, long, long, long, long message" are transmitted by the first user object, the terminal may display the visual information B of the first user object in association with the merged message content in the fused message bubble P06, that is, the visual information B of the first user object is displayed in association with "this is a long, long, long, long message this is a long, long, long, long, long, long, long, long, long message".

In the foregoing embodiment, in response to that the second message content is transmitted by the first user object, the visual information of the first user object is displayed in association with the merged message content in the fused message bubble, which may further improve the display effect of the merged message content.

In an embodiment, in response to that the second message content is transmitted by a second user object different from the first user object, the first message content is displayed in association with the visual information of the first user object in the generated fused message bubble, and the second message content in the fused message bubble is displayed in association with the visual information of the second user object.

For example, as shown in FIG. 12, in response to that the first message content, i.e. "this is a message" is transmitted by the first user object, and the second message content, i.e. "this is a long, long, long, long message this is a long, long, long, long, long, long, long, long, long message" is transmitted by the second user object different from the first user object, the terminal may display the first message content in association with the visual information A of the first user object in the fused message bubble P06, and simultaneously displays the second message content in association with the visual information B of the second user object in the fused message bubble P06, that is, "this is a message" is displayed in association with the visual information A of the first user object, and "this is a long, long, long, long message this is a long, long, long, long, long, long, long, long, long message" is displayed in association with the visual information B of the second user object.

In the foregoing embodiment, in response to that the second message content is transmitted by the second user object different from the first user object, the first message content is displayed in association with the visual information of the first user object in the fused message bubble, and the second message content is displayed in association with the visual information of the second user object in the fused message bubble, so that the display effect of the merged message content may be further improved.

In an embodiment, the first message content and the second message content in the merged message content are displayed sequentially according to the message acquisition time respectively corresponding to the first message content and the second message content.

The message acquisition time is the time when the terminal acquires the message content.

The terminal may determine the message acquisition time respectively corresponding to the first message content and the second message content, and sequentially display the first message content and the second message content in the merged message content according to a sequence of the message acquisition time respectively corresponding to the first message content and the second message content.

In the foregoing embodiment, the first message content and the second message content in the merged message content are displayed sequentially according to the message acquisition time respectively corresponding to the first message content and the second message content, so that the display effect of the merged message content may be improved.

In an embodiment, the terminal may display the first message content in association with the message acquisition time of the first message content in the fused message bubble, and display the second message content in association with the message acquisition time of the second message content in the fused message bubble.

In an embodiment, the first message content is displayed in the message display area of the information interaction page, and the second message content is displayed in a message editing area of the information interaction page; and in response to that the first message content is moved to the area where the second message content is located, in response to the end of the continuous action operation, displaying the merged message content including the first message content and the second message content includes:

in response to that the first message content is moved to the message editing area, in response to the end of the continuous action operation, the merged message content including the first message content and the second message content is displayed in the message editing area.

The message editing area refers to an area for editing message content in the information interaction page.

In some embodiments, in response to that the first message content is moved from the message display area of the information interaction page to the message editing area of the information interaction page, the terminal may merge the first message content and the second message content in response to the end of the continuous action operation, and display the merged message content including the first message content and the second message content in the message editing area.

In the foregoing embodiment, in response to that the first message content is moved to the message editing area, the first message content and the second message content may be merged in the message editing area in response to the end of the continuous action operation, and the merged message content including the first message content and the second message content may be displayed in the message editing area, so that a new message merging way is provided.

In an embodiment, the first message content is stored in a first message bubble; and after the merged message content including the first message content and the second message content is displayed in the message editing area in response to the end of the continuous action operation, the method further includes: the first message bubble is resumed to be displayed in the initial position before the continuous action operation; and the initial position is a position where the first message bubble is located in the message display area before responding to the continuous action operation.

In some embodiments, the terminal may move the first message bubble in the message display area to the second message content in the message editing area in response to the continuous action operation for the first message bubble. In response to that the first message bubble is moved to the message editing area, the terminal may merge the first message content and the second message content in response to the end of the continuous action operation, and display the merged message content including the first message content and the second message content in the message editing area. The terminal may determine the initial position where the first message bubble is located in the message display area before responding to the continuous action operation. After the merged message content including the first message content and the second message content is displayed in the message editing area, the terminal may resume displaying the first message bubble in the initial position before the continuous action operation.

In the foregoing embodiment, the first message bubble is resumed to be displayed in the initial position before the continuous action operation. The display effect of the message content may be improved, and the next message merging for the first message content may also be facilitated.

In an embodiment, the terminal may merge the first message content and the second message content in response to the end of the continuous action operation, display the merged message content including the first message content and the second message content in the message editing area, and stop displaying the first message bubble in the message display area.

In an embodiment, the second message content is moved to the message editing area through the continuous action operation before the first message content; the first message content and the second message content in the merged message content are displayed sequentially according to a movement sequence corresponding to the first message content and the second message content respectively; and the movement sequence refers to a sequence that the first message content and the second message content are moved to the message editing area.

In some embodiments, the terminal may move the second message content to the message editing area in response to the continuous action operation for the second message content. Further, the terminal may move the first message content to the second message content in the message editing area in response to the continuous action operation for the first message content. In response to that the first message content is moved to the message editing area, the terminal may merge the first message content and the second message content in response to the end of the continuous action operation. The terminal may display the merged message content including the first message content and the second message content according to a sequence that the first message content and the second message content are moved to the message editing area respectively.

Figure 14:
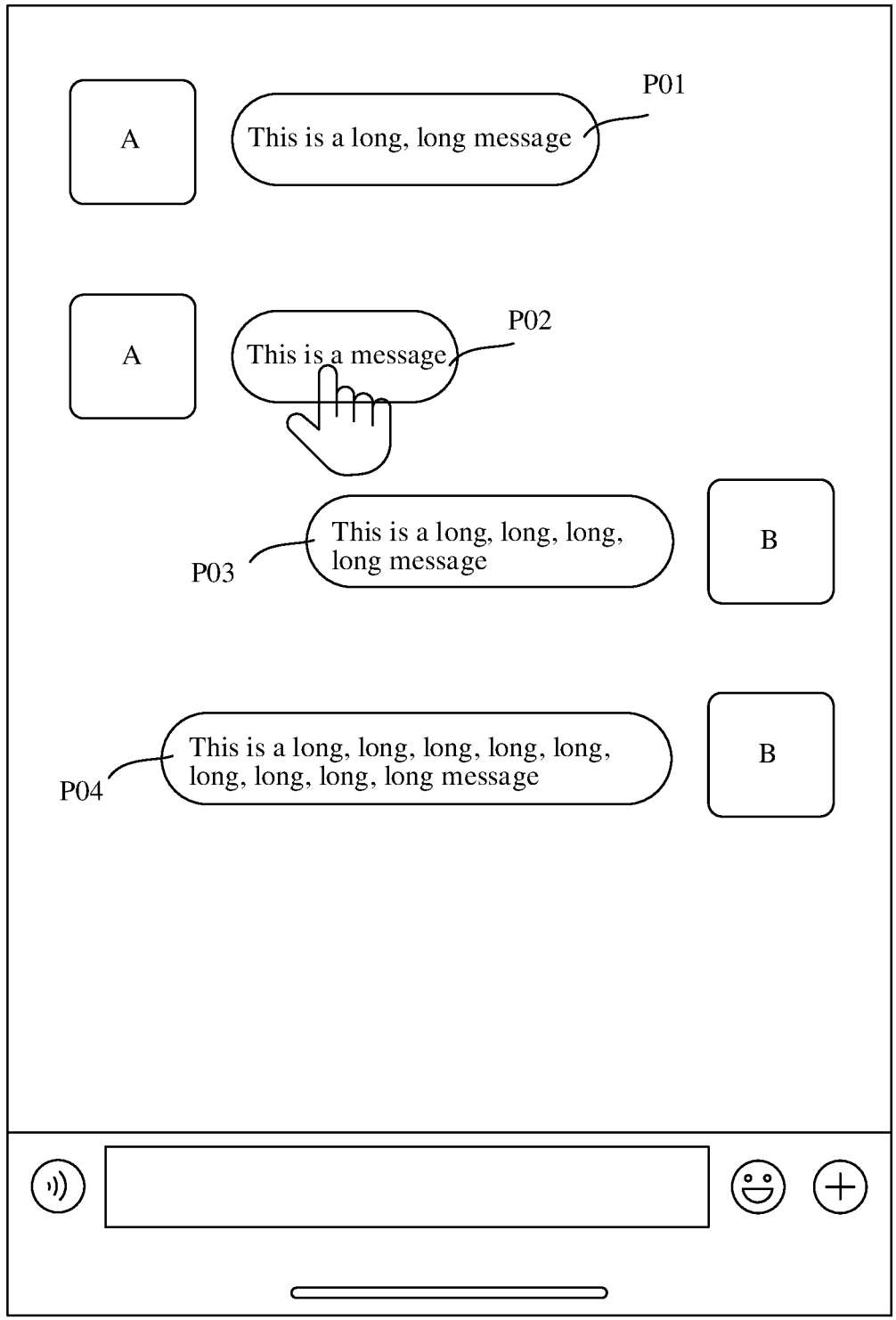
FIG. 14 is a schematic diagram of a message content activation process in another embodiment.
Figure 15:
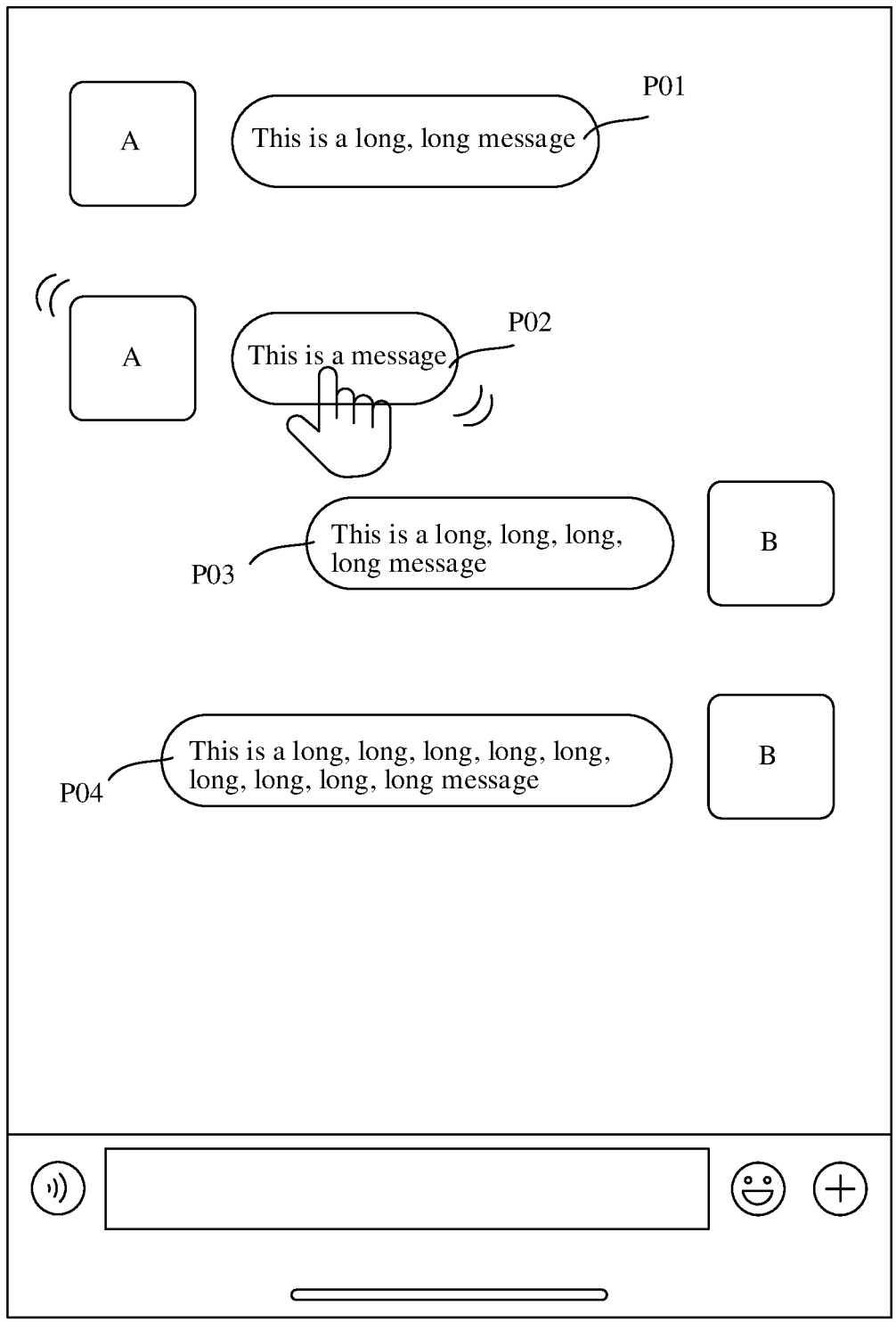
FIG. 15 is a schematic diagram of activated message content in another embodiment.
Figure 16:
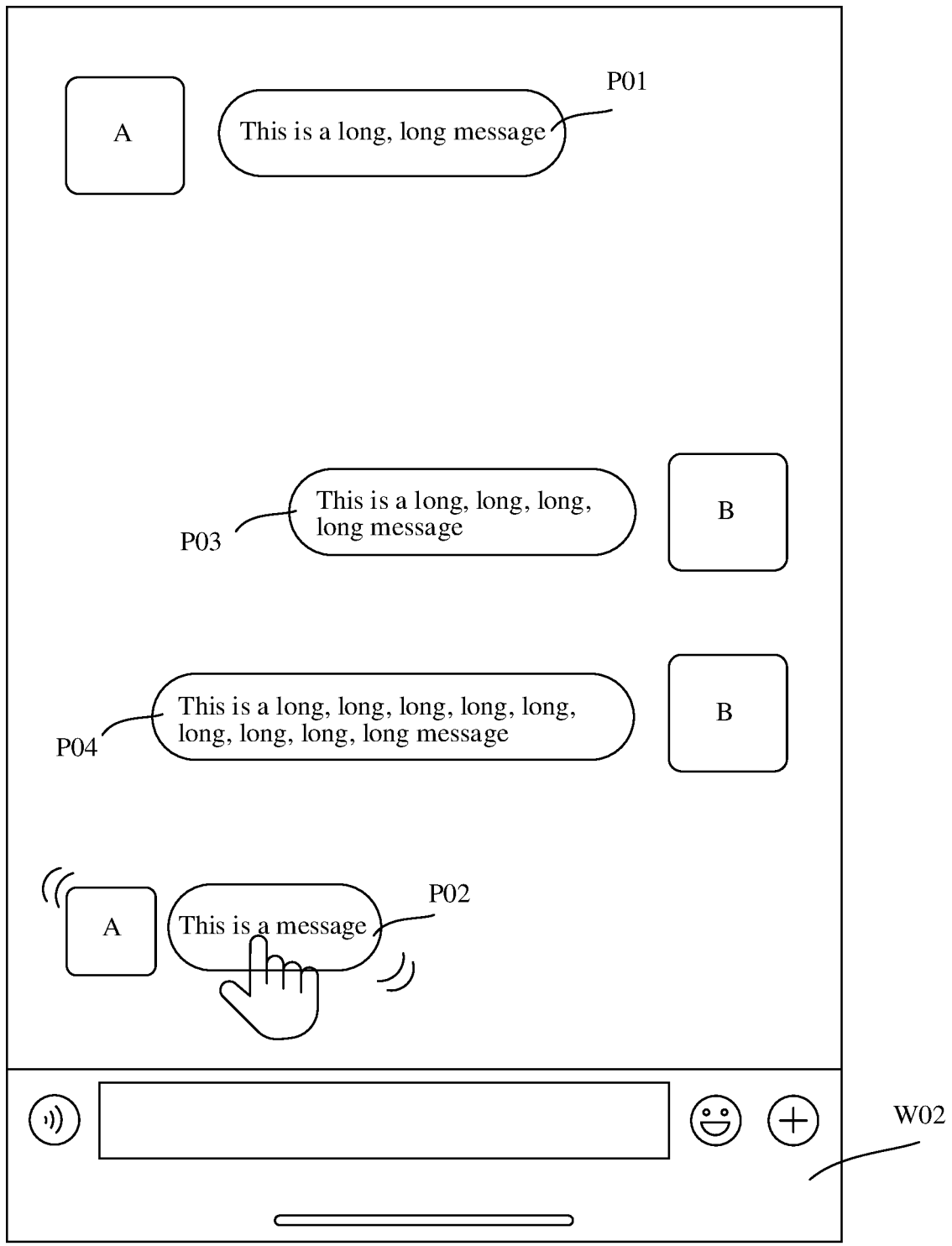
FIG. 16 is a schematic diagram of a process in which a message bubble is dragged to move to a message display area in an embodiment.
Figure 17:
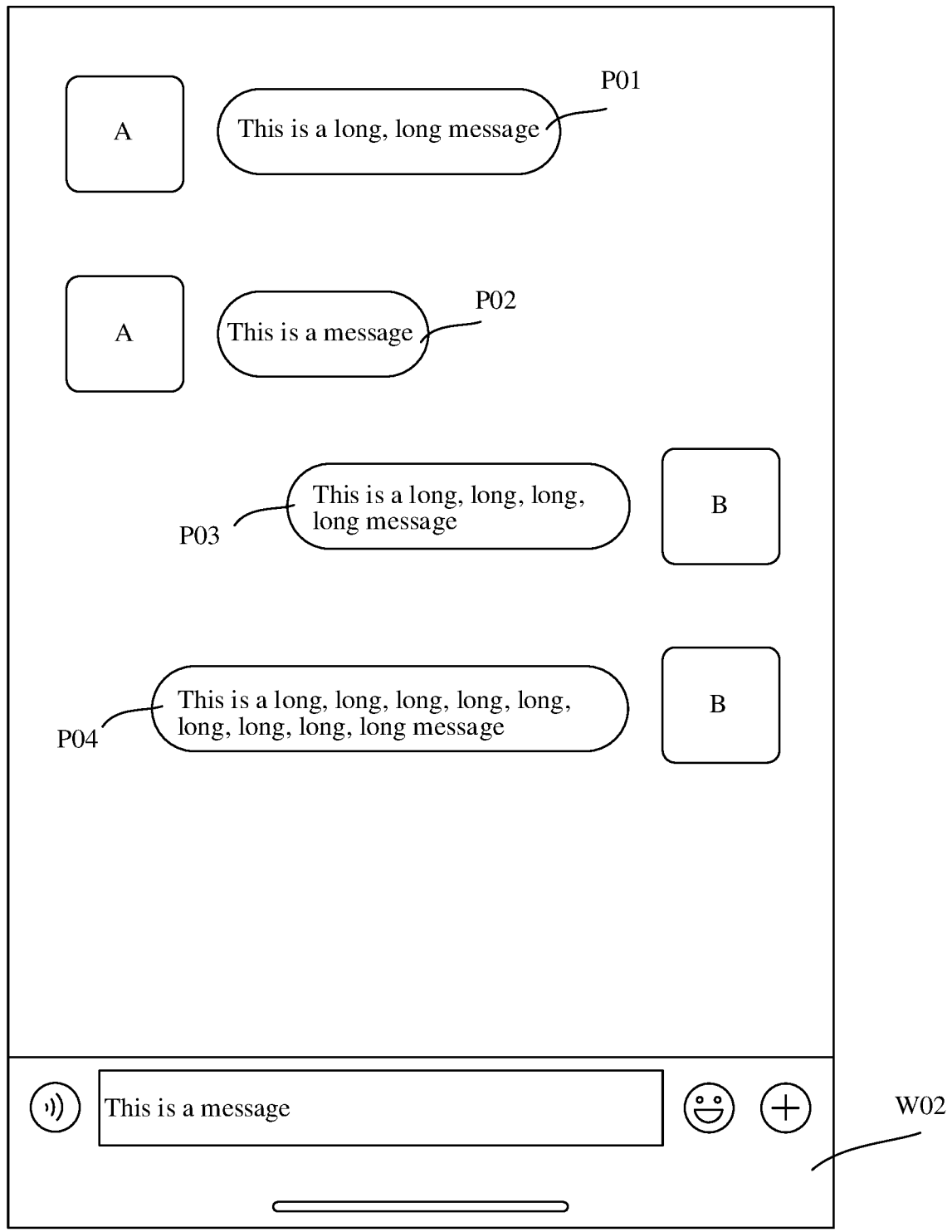
FIG. 17 is a schematic diagram showing that one message content is moved to a message display area in an embodiment.
Figure 18:
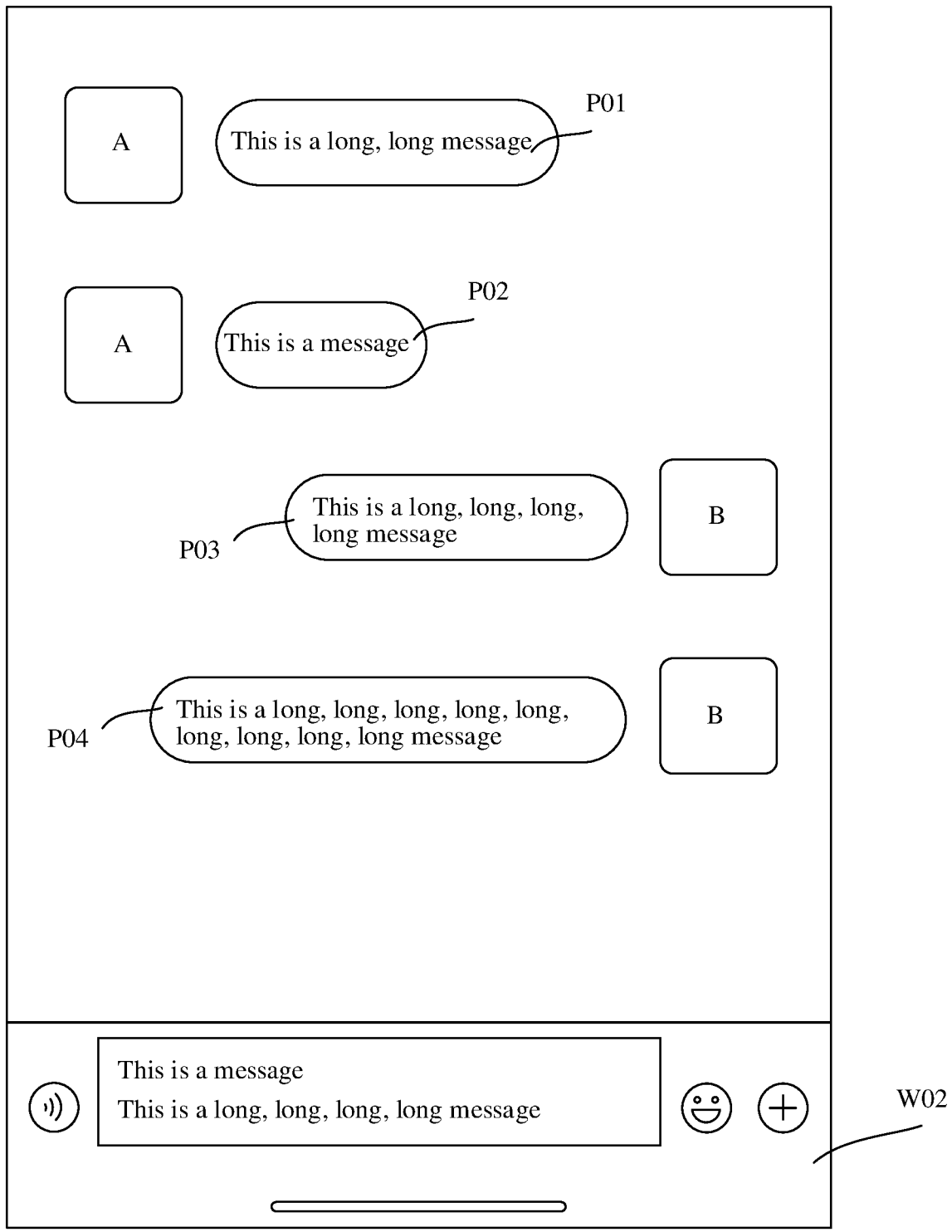
FIG. 18 is a schematic diagram showing that two message content is moved to a message display area in an embodiment.

In an embodiment, the continuous action operation includes a drag operation. Referring to FIG. 14, the first message content, i.e. "this is a long, long, long, long message" is stored in the first message bubble P03, and the second message content, i.e. "this is a message" is stored in the second message bubble P02. Referring to FIG. 15, the terminal may activate the second message bubble P02 in response to a movement activation operation for the second message bubble P02, and the activated second message bubble P02 may be dragged to move. Referring to FIG. 16, the terminal may move the second message bubble P02 to the message editing area W02 in response to the drag operation for the second message bubble P02. Referring to FIG. 17, the terminal may move the second message content in the second message bubble P02 to the message editing area W02. As shown in FIG. 18, the terminal may move the first message content in the first message bubble P03 to the second message content in the message editing area W02 in response to the drag operation for the first message bubble P03. In response to that the first message content is moved to the message editing area W02, in response to the end of the drag operation, the terminal may display the merged message content including the first message content and the second message content, i.e. "this is a message this is a long, long, long, long message" in the message editing area W02.

In the foregoing embodiment, the first message content and the second message content in the merged message content are displayed sequentially according to the movement sequence respectively corresponding to the first message content and the second message content, so that a new message content display way may be provided, and the display effect of the message content may also be improved.

Figure 19:
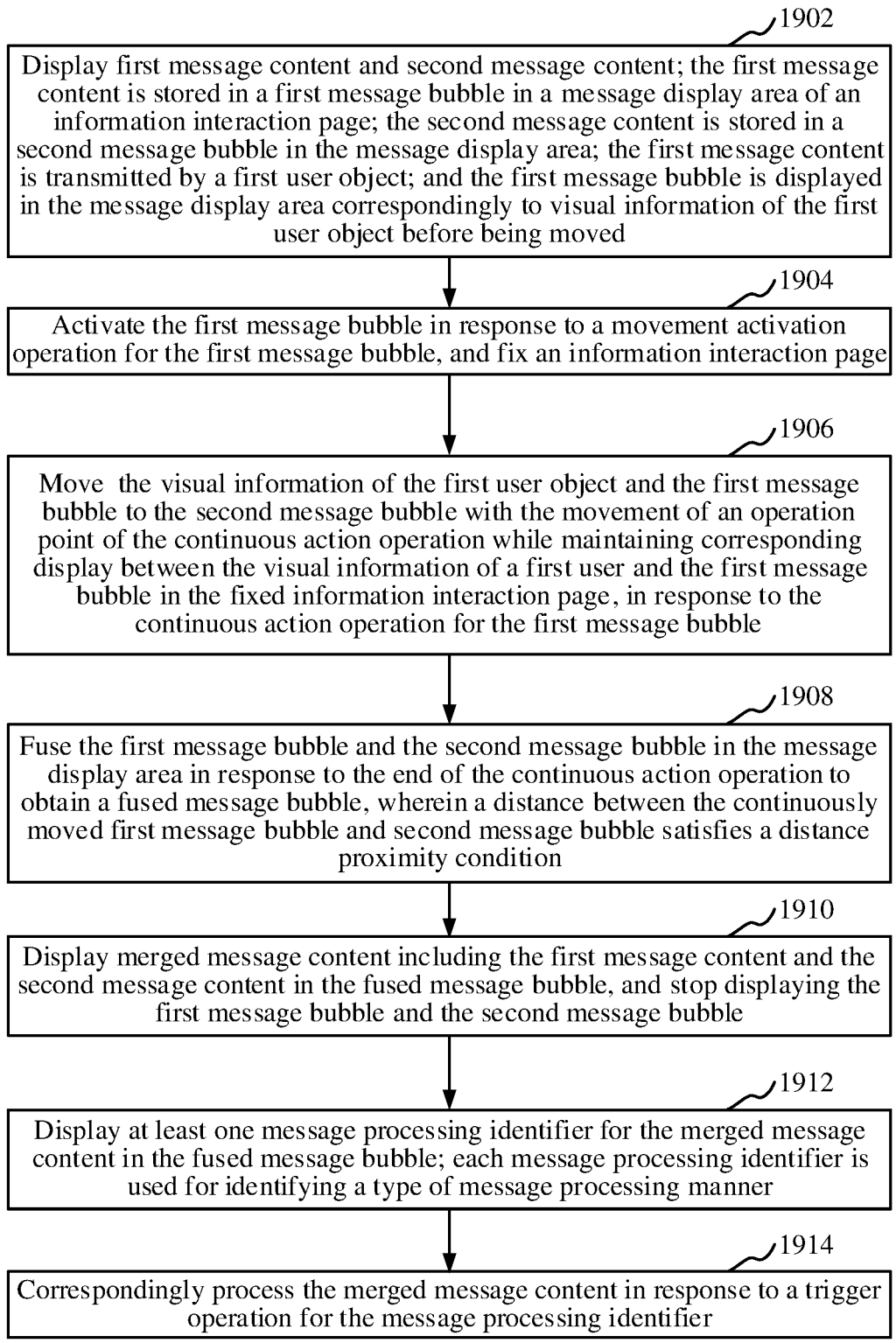
FIG. 19 is a flowchart of a message processing method in another embodiment.

As shown in FIG. 19, in an embodiment, a message processing method is provided. The method may be applied to a terminal, and is executed independently by the terminal, or implemented by interaction between the terminal and the server. This embodiment is described by using an example in which the method is applied to the terminal 102 in FIG. 1. The method includes the following steps:

Step 1902: Display first message content and second message content; the first message content is stored in a first message bubble in a message display area of an information interaction page; and the second message content is stored in a second message bubble in the message display area; the first message content is transmitted by a first user object; and the first message bubble is displayed in the message display area correspondingly to visual information of the first user object before being moved.

Step 1904: Activate the first message bubble in response to a movement activation operation for the first message bubble, and fix an information interaction page.

Step 1906: In response to the continuous action operation for the first message bubble, move visual information of the first user object and the first message bubble to a second message bubble in accordance with the movement of an operation point of a continuous action operation while maintaining corresponding display between the visual information of the first user and the first message bubble in the fixed information interaction page.

Step 1908: Fuse the first message bubble and the second message bubble in the message display area in response to the end of the continuous action operation to obtain a fused message bubble, wherein a distance between the moved first message bubble and second message bubble satisfies a distance proximity condition.

Step 1910: Display merged message content including the first message content and the second message content in the fused message bubble, and stop displaying the first message bubble and the second message bubble.

In an embodiment, in response to that the second message content is transmitted by the first user object, the visual information of the first user object is displayed in association with the merged message content in the fused message bubble.

In an embodiment, in response to that the second message content is transmitted by a second user object different from the first user object, the first message content is displayed in association with the visual information of the first user object in the generated fused message bubble, and the second message content in the fused message bubble is displayed in association with the visual information of the second user object.

In an embodiment, the first message content and the second message content in the merged message content are displayed sequentially according to message acquisition time respectively corresponding to the first message content and the second message content.

Step 1912: Display at least one message processing identifier for the merged message content in the fused message bubble. Each message processing identifier indicates a type of message processing manner.

Step 1914: Correspondingly process the merged message content in response to a trigger operation for the message processing identifier.

In an embodiment, the at least one message processing identifier includes at least one of a message forwarding identifier and a message collection identifier; and correspondingly processing the merged message content in response to the trigger operation for the message processing identifier includes at least one of the following processing: in response to the trigger operation for the message forwarding identifier, the merged message content is forwarded; and in response to the trigger operation for the message collection identifier, the merged message content is collected.

In an embodiment, the first message content is displayed in the first message bubble in the message display area, and the second message content is displayed in a message editing area of an information interaction page. In response to that the first message bubble is moved to the message editing area, in response to the end of the continuous action operation, the merged message content including the first message content and the second message content is displayed in the message editing area.

In an embodiment, the first message bubble is resumed to be displayed in an initial position before the continuous action operation; and the initial position is a position where the first message bubble is located in the message display area before responding to the continuous action operation.

In an embodiment, the second message content is moved to the message editing area through the continuous action operation before the first message content; the first message content and the second message content in the merged message content are displayed sequentially according to a movement sequence corresponding to the first message content and the second message content respectively; and the movement sequence refers to a sequence that the first message content and the second message content are moved to the message editing area.

The present disclosure also provides an application scenario. The application scenario uses the above-mentioned message processing method. In some embodiments, the message processing method may be applied to a scenario of message merging in instant communication. An instant communication application is installed on a terminal. The terminal may execute the above-mentioned message processing method by using the instant communication application. In some embodiments, the terminal may display first instant message content and second instant message content; the first instant message content is stored in a first instant message bubble in an instant message display area of an information interaction page; the second instant message content is stored in a second instant message bubble in the instant message display area; the first instant message content is transmitted by a first user object; and the first instant message bubble is displayed in the instant message display area correspondingly to visual information of the first user object before being moved. The first instant message bubble is activated in response to a movement activation operation for the first instant message bubble, and the information interaction page is fixed.

The terminal may make the visual information of the first user object and the first instant message bubble to move to the second instant message bubble with the movement of an operation point of a continuous action operation in response to the continuous action operation for the first instant message bubble, corresponding display between the visual information of the first user and the first instant message bubble is maintained in the fixed information interaction page. In response to that a distance between the moved first instant message bubble and second instant message bubble satisfies a distance proximity condition, in response to the end of the continuous action operation, the first instant message bubble and the second instant message bubble are fused in the instant message display area to obtain a fused instant message bubble. Merged instant message content including the first instant message content and the second instant message content is displayed in the fused instant message bubble, and the first instant message bubble and the second instant message bubble are no longer displayed.

In response to that the second instant message content is transmitted by the first user object, the visual information of the first user object is displayed in association with the merged instant message content in the fused instant message bubble. In response to that the second instant message content is transmitted by a second user object different from the first user object, the first instant message content is displayed in association with the visual information of the first user object in the generated fused instant message bubble, and the second instant message content in the fused instant message bubble is displayed in association with the visual information of the second user object. It should be noted that, the first instant message content and the second instant message content in the merged instant message content may be displayed sequentially according to message acquisition time respectively corresponding to the first instant message content and the second instant message content.

The terminal may display at least one instant message processing identifier for the merged instant message content in the fused instant message bubble. Each instant message processing identifier indicates a type of instant message processing manner. In response to a trigger operation for the instant message processing identifier, the merged instant message content is correspondingly processed.

The at least one instant message processing identifier includes at least one of an instant message forwarding identifier and an instant message collection identifier; correspondingly processing the merged instant message content in response to the trigger operation for the instant message processing identifier includes at least one of the following processing: in response to the trigger operation for the instant message forwarding identifier, the merged instant message content is forwarded; and in response to the trigger operation for the instant message collection identifier, the merged instant message content is collected.

In response to that the first instant message content is displayed in the first instant message bubble in the instant message display area, the second instant message content is displayed in an instant message editing area of the information interaction page; and in response to that the first instant message bubble is moved to the instant message editing area, in response to the end of the continuous action operation, the terminal may display the merged instant message content including the first instant message content and the second instant message content in the instant message editing area. The terminal may resume displaying the first instant message bubble in an initial position before the continuous action operation; and the initial position is a position where the first instant message content is located in the instant message display area before responding to the continuous action operation. It should be noted that, the second instant message content may be moved to the instant message editing area through the continuous action operation before the first instant message content; the first instant message content and the second instant message content in the merged instant message content may be displayed sequentially according to a movement sequence respectively corresponding to the first instant message content and the second instant message content; and the movement sequence refers to a sequence that the first instant message content and the second instant message content are moved to the instant message editing area.

In the present disclosure, by moving the first instant message content to the second instant message content through the continuous action operation for the first instant message content, the first instant message content and the second instant message content are instantly merged, which may integrate multiple instant message content into one instant message content more conveniently, that is, the instant message content is merged, thereby improving the merging efficiency of the instant messages. Furthermore, the user may also correspondingly process the merged instant message content rapidly and conveniently, in particular, the instant communication user may transmit the merged instant message content to other users participating in the instant communication rapidly and conveniently, which meets the service requirements of quick response to instant messages in instant communication application scenarios, thereby further improving the message processing efficiency.

The present disclosure further provides an application scenario. The application scenario uses the above-mentioned message processing method. In some embodiments, the message processing method may be applied to a scenario of message merging in non-instant communication. Through the message processing method of the present disclosure, first non-instant message content and second non-instant message content may be merged rapidly and conveniently, thereby improving the merging efficiency of messages in the non-instant communication scenario. For example, the message processing method of the present disclosure may be applied to the merging of messages of social platforms. For example, the message processing method may be applied to the scenario of message merging of web forums, in some embodiments, first comment message content and second comment message content are displayed in a page of the web forum; and the terminal may move the first comment message content to the second comment message content through the continuous action operation for the first comment message content so as to merge the first comment message content and the second comment message content, thereby improving the merging efficiency of messages of the web forum. The message processing method of the present disclosure may also be applied to at least one of a message merging scenario, a barrage message merging scenario, and the like in a video streaming platform.

It is to be understood that, although the steps in the flowchart of various embodiments are displayed sequentially, these steps are not necessarily performed sequentially according to the sequence. Unless explicitly stated in the description, the execution of these steps is not strictly limited in sequence, and these steps may be executed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Figure 20:
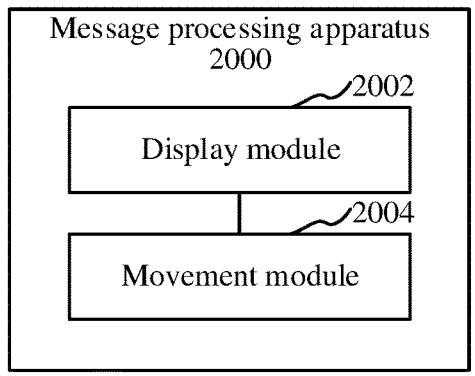
FIG. 20 is a structural block diagram of a message processing apparatus in an embodiment.

In an embodiment, as shown in FIG. 20, a message processing apparatus 2000 is provided. The apparatus may adopt a software module or a hardware module, or a part of a computer device composed of the software module or the hardware module. The apparatus specifically includes:

a display module 2002, configured to display first message content and second message content; and a movement module 2004, configured to move the first message content to the second message content in response to a continuous action operation for the first message content.

The display module 2002 is further configured to display merged message content including the first message content and the second message content in response to the end of the continuous action operation in response to that the first message content is moved to an area where the second message content is located.

In an embodiment, the first message content and the second message content are displayed in an information interaction page; the movement module 2004 is further configured to activate the first message content in response to a movement activation operation for the first message content, and fix the information interaction page; a display position of the fixed information interaction page is not changed during the continuous action operation for the first message content; and in response to the continuous action operation for the activated first message content, the first message content is moved to the second message content in the fixed information interaction page.

In an embodiment, the movement module 2004 is further configured to make the first message content move to the second message content with the movement of an operation point of the continuous action operation in response to the continuous action operation for the first message content.

In an embodiment, the first message content and the second message content are displayed in a message display area of the information interaction page; and the display module 2002 is further configured to display the merged message content including the first message content and the second message content in the message display area in response to the end of the continuous action operation in response to that the first message content is moved to the area where the second message content is located in the message display area.

In an embodiment, the display module 2002 is further configured to display at least one message processing identifier for the merged message content in the message display area, where each message processing identifier indicates a type of message processing manner; and correspondingly process the merged message content in response to the trigger operation for the message processing identifier.

In an embodiment, the at least one message processing identifier includes at least one of a message forwarding identifier and a message collection identifier; correspondingly processing the merged message content in response to the trigger operation for the message processing identifier includes at least one of the following processing: in response to the trigger operation for the message forwarding identifier, the merged message content is forwarded; and in response to the trigger operation for the message collection identifier, the merged message content is collected.

In an embodiment, the display module 2002 is further configured to display the merged message content including the first message content and the second message content in the message display area in response to the end of the continuous action operation in response to that a distance between the moved first message content and second message content satisfies a distance proximity condition.

In an embodiment, the first message content is stored in a first message bubble in the message display area; the second message content is stored in a second message bubble in the message display area; the continuous action operation is configured to move the first message bubble to the second message bubble; the display module 2002 is further configured to fuse the first message bubble and the second message bubble in the message display area in response to the end of the continuous action operation in response to that the distance between the continuously first message bubble and second message bubble satisfies the distance proximity condition to obtain a fused message bubble; and display the merged message content including the first message content and the second message content in the fused message bubble.

In an embodiment, the display module 2002 is further configured to fuse the first message bubble and the second message bubble in the message display area in response to the end of the continuous action operation in response to that the distance between the moved first message bubble and second message bubble satisfies the distance proximity condition to obtain the fused message bubble, and make the first message bubble and the second message bubble no longer displayed.

In an embodiment, the first message content is transmitted by a first user object; the first message bubble is displayed in the message display area correspondingly to visual information of the first user object before being moved; and the movement module 2004 is further configured to move the visual information of the first user object and the first message bubble to the second message bubble in response to the continuous action operation for the first message bubble while maintaining corresponding display between the visual information of the first user and the first message bubble.

In an embodiment, in response to that the second message content is transmitted by the first user object, the visual information of the first user object is displayed in association with the merged message content in the fused message bubble.

In an embodiment, in response to that the second message content is transmitted by a second user object different from the first user object, the first message content is displayed in association with the visual information of the first user object in the generated fused message bubble, and the second message content in the fused message bubble is displayed in association with the visual information of the second user object.

In an embodiment, the first message content and the second message content in the merged message content are displayed sequentially according to message acquisition time respectively corresponding to the first message content and the second message content.

In an embodiment, the first message content is displayed in the message display area of the information interaction page, and the second message content is displayed in a message editing area of the information interaction page; and the display module 2002 is further configured to display the merged message content including the first message content and the second message content in the message editing area in response to the end of the continuous action operation in response to that the first message content is moved to the message editing area.

In an embodiment, the first message content is stored in the first message bubble; the display module 2002 is further configured to resume displaying the first message bubble in an initial position before the continuous action operation; and the initial position is a position where the first message bubble is located in the message display area before responding to the continuous action operation.

In an embodiment, the second message content is moved to the message editing area through the continuous action operation before the first message content; the first message content and the second message content in the merged message content are displayed sequentially according to a movement sequence corresponding to the first message content and the second message content respectively; and the movement sequence refers to a sequence that the first message content and the second message content are moved to the message editing area.

In an embodiment, the display module 2002 is further configured to determine the message acquisition time respectively corresponding to the first message content and the second message content; and display the first message content and the second message content sequentially in a display interface according to a sequence of the message acquisition time corresponding to the first message content and the second message content respectively.

In an embodiment, the display module 2002 is further configured to resume displaying the first message content in the initial position before the continuous action operation in response to that the first message content is not moved to an area where the second message content is located, but the continuous action operation is ended.

By displaying the first message content and the second message content, the foregoing message processing apparatus may move the first message content to the second message content in response to the continuous action operation for the first message content. In response to that the first message content is moved to the area where the second message content is located, in response to the end of the continuous action operation, the merged message content including the first message content and the second message content may be displayed. Compared with the traditional method of selecting multiple messages for message merging, in the present disclosure, the first message content is moved to the second message content through the continuous action operation for the first message content so as to merge the first message content and the second message content, which may integrate multiple messages into one message more conveniently, thereby improving the message merging efficiency.

Each module in the foregoing message processing apparatus may be implemented entirely or partially through software, hardware, or a combination thereof. The foregoing modules may be embedded to or may be independent from a processor in a computer device in a hardware form, and may also be stored in a memory in the computer device in a software form, so as to be invoked by the processor to execute the operations corresponding to each module.

In an embodiment, a computer device is provided. The computer device may be a terminal, and an internal structure of the computer device may be shown in FIG. 21. The computer device includes a processor, a memory, an input/output interface, a communication interface, a display unit, and an input apparatus. The processor, the memory, and the input/output interface are connected by a system bus, and the communication interface, the display unit, and the input apparatus are connected to the system bus through the input/output interface. The processor of the computer device is configured to provide computation and control ability. The memory of the computer device includes a non-volatile storage medium and an internal memory. The non-volatile storage medium stores an operating system and computer-readable instructions. The internal memory provides an environment for running the operating system and the computer-readable instructions in the non-volatile storage medium. The input/output interface of the computer device is configured to exchange information between the processor and peripheral equipment. The communication interface of the computer device is configured to communicate with external terminals in a wired way or a wireless way, and the wireless way may be implemented by WIFI, mobile cellular networks, NFC (near-field communication), or other technologies. The computer-readable instructions, when executed by the processor, implement a message processing method. The display unit of the computer device is configured to form a visible picture, and may be a display screen, a projection apparatus, or a virtual reality imaging apparatus. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

Figure 21:
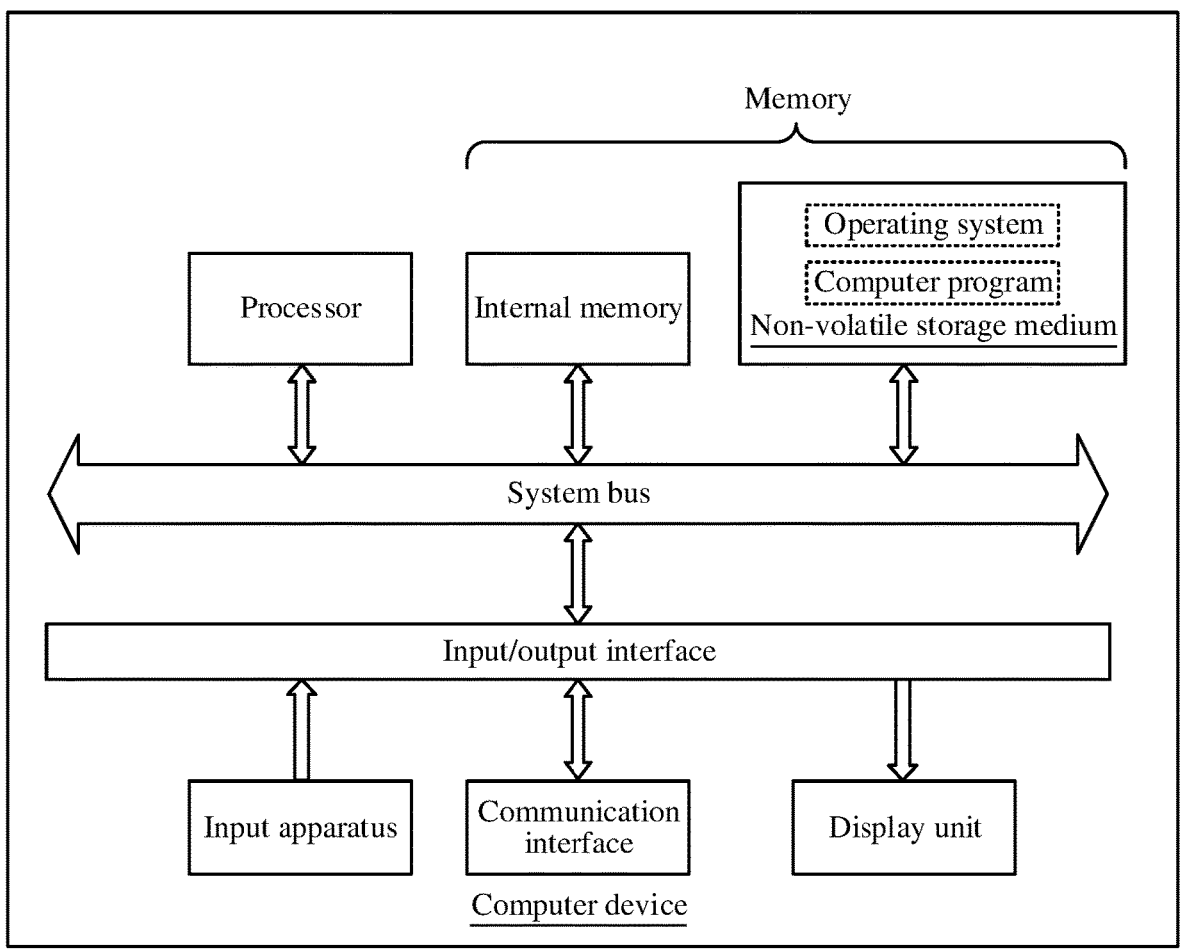
FIG. 21 is a diagram of an internal structure of a computer device in an embodiment.

A person skilled in the art may understand that, the structure shown in FIG. 21 is merely a block diagram of a partial structure related to a scheme in the present disclosure, and does not constitute a limitation to the computer device to which the scheme in the present disclosure is applied. In some embodiments, the computer device may include more components or fewer components than those shown in the figure, or some components may be combined, or a different component deployment may be used.

In an embodiment, a computer device is also provided, which includes a memory and one or more processors. The memory stores computer-readable instructions, and the computer-readable instructions, when executed by the one or more processors, perform steps in each method embodiment.

In an embodiment, one or more computer-readable storage media are provided, and store computer-readable instructions. The computer-readable instructions, when executed by one or more processors, perform steps in each foregoing method embodiment.

In an embodiment, a computer program product is provided, which includes computer-readable instructions. The computer-readable instructions, when executed by one or more processors, perform steps in each foregoing method embodiment.

It should be noted that, the user information (including but not limited to information of the user equipment, personal information of the user), and data (including but not limited to to-be-analyzed data, stored data, and to-be-displayed data) involved in the present disclosure are all authorized by the user or fully authorized by all parties, and the collection, use and processing of relevant data need to comply with relevant laws, regulations and standards of relevant countries and regions.

A person of ordinary skill in the art may understand that all or some of procedures of the method in the foregoing embodiments may be implemented by computer-readable instructions instructing relevant hardware. The computer-readable instructions may be stored in a non-volatile computer-readable storage medium. The computer-readable instructions, when executed, may include the procedures of each foregoing method embodiment. Any reference to the memory, storage, database, or other media used in the embodiments provided in the present disclosure may all include at least one of a non-volatile memory or a volatile memory. The non-volatile memory may include a read-only memory (ROM), a storage tape, a soft disk, a flash memory, an optical memory, etc. The volatile memory may be a random access memory (RAM) or an external cache memory. As illustration rather than limitation, RAM may be in various forms, such as a static random access memory (SRAM), a dynamic random access memory (DRAM), and the like.

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the present disclosure, which are described specifically and in detail, but cannot be construed as a limitation to the patent scope of the present disclosure. It is to be noted that for a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A message processing method, applied to a terminal, the method comprising:
    displaying, in a same chat page presented on a display screen of the terminal, first message content presented in a first message bubble and second message content presented in a second message bubble;
    detecting a continuous action operation on the first message bubble at the display screen, the continuous action operation comprising a user operation of moving the first message bubble to the second message bubble; and
    displaying, in the same chat interface, merged message content in a single target message bubble in response to an end of the continuous action operation and that the first message bubble is moved to an area where the second message bubble is located, the merged message content comprising the first message content and the second message content.

2. The method according to claim 1, further comprising:
    activating the first message bubble as movable in response to a movement activation operation for the first message bubble, and fixing the chat page; a display position of the fixed chat page being unchanged and the chat page is disabled from sliding during the continuous action operation for the first message content.

3. The method according to claim 1, further comprising:
    moving the first message bubble along with a movement of an operation point of the continuous action operation on the first message bubble.

4. The method according to claim 1, wherein the continuous action operation comprises a drag operation; the method further comprises:
    moving the first message bubble along with a movement of a drag operation point of the drag operation on the first message bubble.

5. The method according to claim 1, further comprising:
    displaying at least one message processing identifier for the merged message content in the target message bubble; each message processing identifier indicating a type of message processing manner; and
    processing the merged message content in response to a trigger operation for the message processing identifier.

6. The method according to claim 5, wherein the at least one message processing identifier comprises at least one of a message forwarding identifier and a message collection identifier; the processing the merged message content in response to a trigger operation for the message processing identifier comprises at least one of:
    forwarding the merged message content in response to the trigger operation for the message forwarding identifier; or
    collecting the merged message content in response to the trigger operation for the message collection identifier.

7. The method according to claim 1, wherein the displaying, in the same chat interface, the merged message content in the single target message bubble in response to an end of the continuous action operation and that the first message bubble is moved to an area where the second message bubble is located comprises:
    displaying the merged message content in the target message bubble in response to the end of the continuous action operation and that a distance between the moved first message bubble and second message bubble satisfies a distance proximity condition.

8. The method according to claim 1, wherein
    the displaying the merged message content in the single target message bubble in response to the end of the continuous action operation and that the first message bubble is moved to an area where the second message bubble is located comprises:
    fusing the first message bubble and the second message bubble in the chat interface in response to the end of the continuous action operation and that the distance between the moved first message bubble and second message bubble satisfies the distance proximity condition to obtain the target message bubble; and
    displaying the merged message content in the target message bubble.

9. The method according to claim 8, wherein the displaying the merged message content in the single target message bubble comprises:
    stop displaying the first message bubble and the second message bubble.

10. The method according to claim 1, wherein the first message content is transmitted by a first user object; the first message bubble is displayed in the chat interface together with visual information of the first user object before being moved;
    the method further comprises:
    in response to the continuous action operation for the first message bubble, moving the visual information of the first user object and the first message bubble to the second message bubble while maintaining corresponding display between the visual information of the first user object and the first message bubble.

11. The method according to claim 10, wherein:
    in response to that the second message content is transmitted by the first user object, displaying the visual information of the first user object in association with the merged message content in the target message bubble; and in response to that the second message content is transmitted by a second user object different from the first user object, the first message content is displayed in association with the visual information of the first user object in the generated target message bubble, and the second message content in the target message bubble is displayed in association with the visual information of the second user object.

12. The method according to claim 1, wherein the first message content and the second message content in the merged message content are displayed sequentially according to message acquisition time respectively corresponding to the first message content and the second message content.

13. The method according to claim 1, wherein the first message content is displayed in a message display area of the chat interface, and the second message content is displayed in a message editing area of the chat interface; and
the displaying the merged message content comprises:
displaying the merged message content in the message editing area in response to the end of the continuous action operation and that the first message content is moved to the message editing area.

14. The method according to claim 13, wherein the method further comprises:
resuming displaying the first message bubble in an initial position before the continuous action operation; and the initial position is a position where the first message bubble is located in the message display area before responding to the continuous action operation.

15. The method according to claim 14, wherein the second message content is moved to the message editing area by using the continuous action operation before the first message content; the first message content and the second message content in the merged message content are displayed sequentially according to a movement sequence corresponding to the first message content and the second message content respectively; and the movement sequence refers to a sequence that the first message content and the second message content are moved to the message editing area.

16. The method according to claim 1, wherein the displaying first message content and second message content comprises:
determining message acquisition time corresponding to the first message content and the second message content respectively; and
displaying the first message content and the second message content sequentially in a display interface according to a sequence of the message acquisition time corresponding to the first message content and the second message content respectively.

17. The method according to claim 1, further comprising:
resuming displaying the first message content in an initial position before the continuous action operation in response to that the first message content is not moved to the area where the second message content is located, but the continuous action operation is ended.

18. A message processing apparatus, comprising:
at least one memory and one or more processors, the at least one memory storing computer-readable instructions, and the one or more processors, when executing the computer-readable instructions, performing:
displaying, in a same chat page presented on a display screen of the terminal, first message content presented in a first message bubble and second message content presented in a second message bubble;
detecting a continuous action operation on the first message bubble at the display screen, the continuous action operation comprising a user operation of moving the first message bubble to the second message bubble; and
displaying, in the same chat interface, merged message content in a single target message bubble in response to an end of the continuous action operation and that the first message bubble is moved to an area where the second message bubble is located, the merged message content comprising the first message content and the second message content.

19. One or more non-transitory computer-readable storage media, storing computer-readable instructions, the computer-readable instructions, when executed by one or more processors, causing the one or more processors to perform:
displaying, in a same chat page presented on a display screen of the terminal, first message content presented in a first message bubble and second message content presented in a second message bubble;
detecting a continuous action operation on the first message bubble at the display screen, the continuous action operation comprising a user operation of moving the first message bubble to the second message bubble; and
displaying, in the same chat interface, merged message content in a single target message bubble in response to an end of the continuous action operation and that the first message bubble is moved to an area where the second message bubble is located, the merged message content comprising the first message content and the second message content.

* * * * *